US011854526B2

(12) United States Patent
Inoue et al.

(10) Patent No.: US 11,854,526 B2
(45) Date of Patent: Dec. 26, 2023

(54) STORAGE MEDIUM, MICROPHONE, AND ENGINE SPEED ACQUISITION DEVICE

(71) Applicant: HONDA MOTOR CO., LTD., Tokyo (JP)

(72) Inventors: Toshio Inoue, Wako (JP); Hiroyuki Yamada, Tokyo (JP); Hiroshi Tokimoto, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/914,527

(22) PCT Filed: Mar. 30, 2021

(86) PCT No.: PCT/JP2021/013659
§ 371 (c)(1),
(2) Date: Sep. 26, 2022

(87) PCT Pub. No.: WO2021/201015
PCT Pub. Date: Oct. 7, 2021

(65) Prior Publication Data

US 2023/0146577 A1 May 11, 2023

(30) Foreign Application Priority Data

Mar. 31, 2020 (JP) ................................ 2020-062578

(51) Int. Cl.
*G10K 11/178* (2006.01)

(52) U.S. Cl.
CPC .. *G10K 11/17883* (2018.01); *G10K 11/17854* (2018.01); *G10K 2210/128* (2013.01)

(58) Field of Classification Search
None
See application file for complete search history.

(56) References Cited

U.S. PATENT DOCUMENTS 6,717,524 B2 * 4/2004 DeLine .................. B60R 11/02 381/86
2004/0247137 A1 12/2004 Inoue et al.
(Continued)

FOREIGN PATENT DOCUMENTS

JP 2004-361721 A 12/2004
JP 2005-134749 A 5/2005
(Continued)

OTHER PUBLICATIONS

PCT/ISA/210 from International Application PCT/JP2021/013659 with the English translation thereof.

*Primary Examiner* — Kenny H Truong
(74) *Attorney, Agent, or Firm* — Carrier, Shende & Associates P.C.; Joseph P. Carrier; Jeffrey T. Gedeon

(57) ABSTRACT

Provided is an active acoustic control program that can reduce noise in a vehicle interior irrespective of the vehicle type, due to being installed in a device that is easily available to anyone. This active acoustic control program is downloaded using a communicator that transmits and receives data to and from a server, and this program causes a computation process device to execute a process for generating a control signal that causes a canceling sound to be outputted from a speaker provided in an interior of a vehicle in order to reduce noise in the vehicle interior. Said program is provided with an adaptive notch filter that processes a reference signal as an adaptive signal to generate a control signal, and a control filter coefficient update unit that continuously updates a filter coefficient of the adaptive notch filter so that an error signal is minimized.

8 Claims, 27 Drawing Sheets

(56) References Cited

U.S. PATENT DOCUMENTS

| | | | |
|---|---|---|---|
| 2005/0094826 | A1 | 5/2005 | Morishita |
| 2011/0087403 | A1 | 4/2011 | Fujikawa |

FOREIGN PATENT DOCUMENTS

| | | | |
|---|---|---|---|
| JP | 2007-264332 | A | 10/2007 |
| JP | 2011-085662 | A | 4/2011 |
| JP | 2012-131244 | A | 7/2012 |

* cited by examiner

FIG. 6

| NUMBER OF ENGINE CYLINDERS | BASIC SIGNAL FREQUENCY (ORDER) |
|---|---|
| 1 | 0.5 |
| 2 | 1 |
| 3 | 1.5 |
| 4 | 2 |
| 6 | 3 |
| 8 | 4 |
| 10 | 5 |
| 12 | 6 |

FIG. 7

| f | C0^(=W0) | C1^(=W1) |
|---|---|---|
| $f_0$ | $A_0$ | $B_0$ |
| $f_1$ | $A_1$ | $B_1$ |
| ⋮ | ⋮ | ⋮ |
| $f_{a-1}$ | $A_{a-1}$ | $B_{a-1}$ |

STORAGE MEDIUM, MICROPHONE, AND ENGINE SPEED ACQUISITION DEVICE

TECHNICAL FIELD

The present invention relates to an active acoustic control program for causing an operation processing device to execute a process of generating a control signal for outputting a canceling sound from a speaker provided in a vehicle compartment in order to reduce noise in the vehicle compartment, a microphone for detecting a cancellation error noise used when causing the operation processing device to execute the process in accordance with the active acoustic control program, and an engine rotational speed acquisition device for detecting an engine rotational speed used when causing the operation processing device to execute the process in accordance with the active acoustic control program.

BACKGROUND ART

JP 2012-131244 A discloses that a portable terminal is used as an active acoustic control device. An active acoustic control program is installed on the portable terminal. In addition, the portable terminal downloads a transfer characteristic of noise suitable for a vehicle from a server.

SUMMARY OF THE INVENTION

JP 2012-131244 A does not discuss a technique capable of reducing noise in a vehicle compartment, regardless of the type of a vehicle, by installing an active acoustic control program on a device that is readily available to anyone.

The present invention has been made to solve the above-described problems, and an object of the present invention is to provide an active acoustic control program that can reduce noise in a vehicle compartment, regardless of the type of a vehicle, by installing on a device that is readily available to anyone. Also, another object of the present invention is to provide a microphone that detects cancellation error noise used when causing the operation processing device to execute the process in accordance with the active acoustic control program, and an engine rotational speed acquisition device that detects an engine rotational speed used when causing the operation processing device to execute the process in accordance with the active acoustic control program.

An active acoustic control program according to a first aspect of the present invention is downloaded using a communication device that transmits and receives data to and from a server. The active acoustic control program causes an operation processing device to execute a process of generating a control signal that causes a speaker provided in a vehicle compartment of a vehicle to output a canceling sound in order to reduce noise in the vehicle compartment, and the active acoustic control program includes a basic signal generating unit configured to generate a basic signal corresponding to the noise generated from a noise source, an adaptive notch filter configured to adaptively perform signal processing on the basic signal to generate the control signal, an error signal input unit configured to input an error signal corresponding to a cancellation error noise of the noise and the canceling sound output from the speaker based on the control signal, an identifying unit configured to identify a transfer characteristic of a sound in a space of the vehicle compartment to generate a correction value, a reference signal generating unit configured to generate a reference signal by correcting the basic signal based on the correction value, and a filter coefficient updating unit configured to sequentially update a filter coefficient of the adaptive notch filter based on the error signal and the reference signal in a manner that the error signal is minimized.

A second aspect of the present invention is a microphone that detects the cancellation error noise used when causing the operation processing device to execute the process in accordance with the active acoustic control program according to the first aspect above, wherein the microphone is connected by wire or wirelessly to a device on which the active sound control program downloaded using the communication device is installed, and the microphone is detachably mounted in the vehicle compartment.

A third aspect of the present invention is an engine rotational speed acquisition device that acquires a engine rotational speed used when causing the operation processing device to execute the process in accordance with the active acoustic control program according to the first aspect above, wherein the engine rotational speed acquisition device is connected by wire or wirelessly to the device, and is detachably mounted in the vehicle compartment.

According to the present invention, it is possible to reduce noise in the vehicle compartment, regardless of the type of the vehicle, by installing the active acoustic control program on the device that is readily available to anyone.

BRIEF DESCRIPTION OF DRAWINGS

FIG. 6 is a table indicating orders of components of vibration frequency corresponding to the number of cylinders of an engine.

FIG. 7 is a table showing values of control filter coefficients corresponding to respective predetermined frequencies;

DESCRIPTION OF THE INVENTION

First Embodiment

Figure 1:
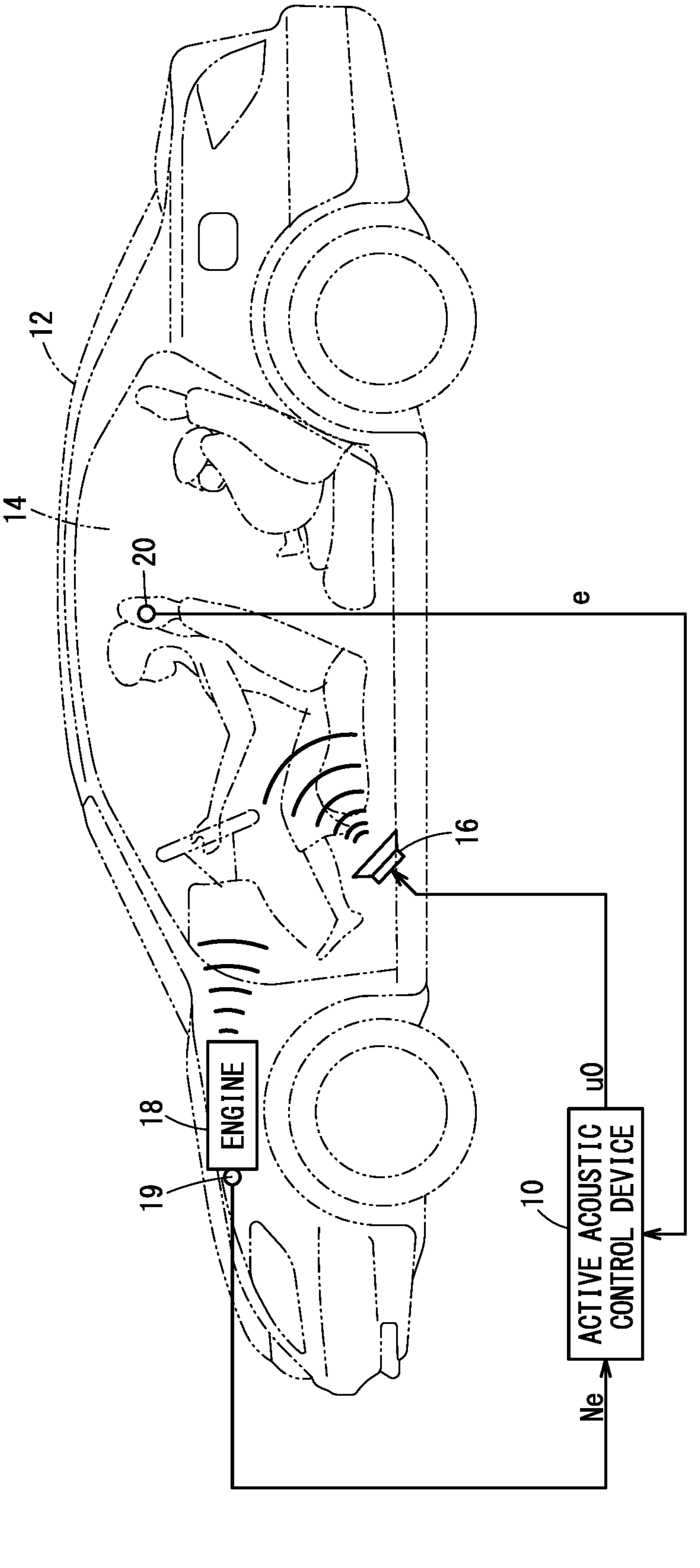
FIG. 1 is a diagram illustrating an overview of active acoustic control.

FIG. 1 is a diagram illustrating an overview of active acoustic control performed by an active acoustic control device 10.

The active acoustic control device 10 outputs a canceling sound from a speaker 16 provided in a vehicle compartment 14 of a vehicle 12, and reduces engine muffled sounds (hereinafter referred to as noise) transmitted to vehicle occupant in the vehicle compartment 14 due to vibration of an engine 18. The active acoustic control device 10 generates a control signal u0 for outputting a canceling sound from the speaker 16 based on an error signal e corresponding to a sound collected by a microphone 20 provided in the vehicle compartment 14 and an engine rotational speed Ne detected by an engine rotational speed sensor 19. The error signal e is a signal corresponding to a cancellation error noise in which the canceling sound and the noise are combined at a position of the microphone 20. The engine 18 corresponds to a drive source of the present invention, and the engine rotational speed sensor 19 corresponds to an engine rotational speed acquisition device of the present invention.

Figure 2:
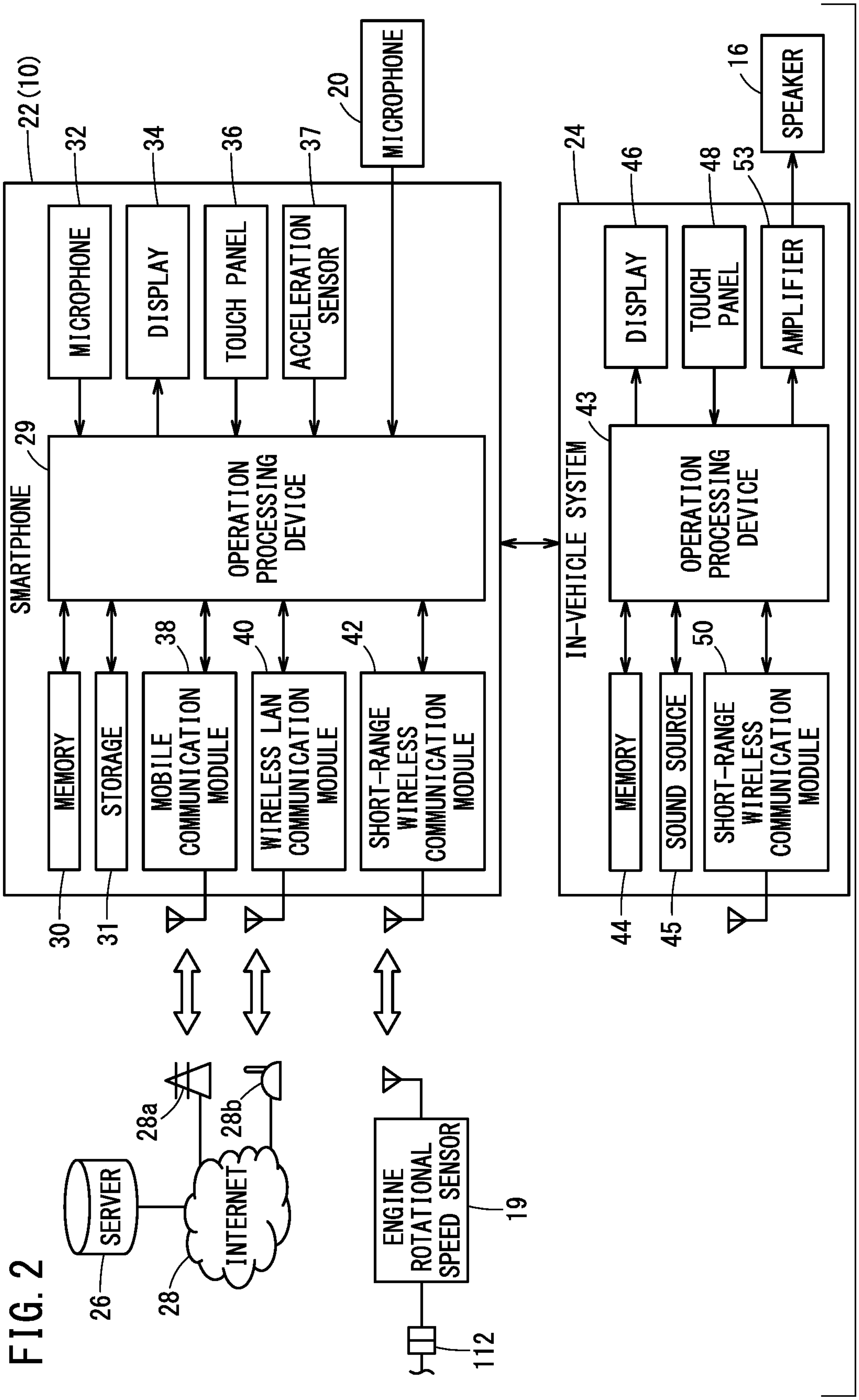
FIG. 2 is a block diagram of a smartphone and an in-vehicle system.

FIG. 2 is a block diagram of a smartphone 22 and an in-vehicle system 24 installed in the vehicle 12.

The smartphone 22 downloads an active acoustic control program from a server 26 via the Internet 28. The downloaded active acoustic control program is installed on the smartphone 22. The smartphone 22 corresponds to a communication device of the present invention.

The smartphone 22 has two terminals, i.e., an external connection terminal and an earphone/microphone terminal (neither of which is shown), as terminals to be connected to an external device. The smartphone 22 is connected to the in-vehicle system 24 and the microphone 20 by wire, and is connected to the engine rotational speed sensor 19 by air (wirelessly).

In the case that the smartphone 22 is connected to the engine rotational speed sensor 19 by wire, the smartphone 22 may be connected to the in-vehicle system 24 wirelessly. In addition, in recent years, some smartphones 22 do not have an earphone/microphone terminal, and in this case, the microphone 20 may also be connected wirelessly.

The engine rotational speed sensor 19 is connected to an on-board diagnostics (OBD) connector 112 provided in the vehicle 12. The OBD connector 112 is connected to an in-vehicle ECU via a CAN or a K line. From the OBD connector 112, vehicle information such as an engine rotational speed, a water temperature, a voltage, and a boost pressure can be acquired from the OBD connector.

The engine rotational speed sensor 19 may be connected to the in-vehicle system 24 by wire such as USB. In this case, the engine rotational speed sensor 19 acquires information on the engine rotational speed flowing through the CAN via the in-vehicle system 24.

Further, the engine rotational speed sensor 19 need not necessarily be provided, but the smartphone 22 may estimate the engine rotational speed based on a DC voltage variation of the vehicle 12 for charging the smartphone 22 or the like.

Figure 3B:
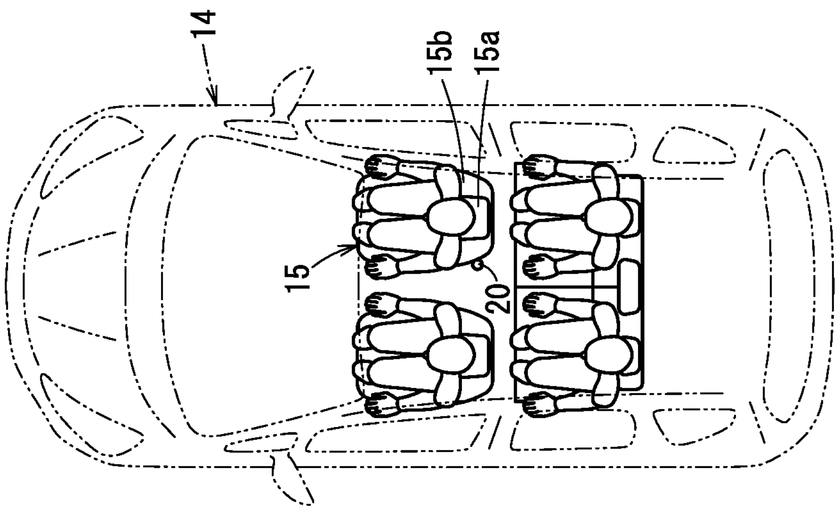
FIGS. 3A and 3B are diagrams showing examples of installation positions of microphones in a vehicle compartment.
Figure 3A:
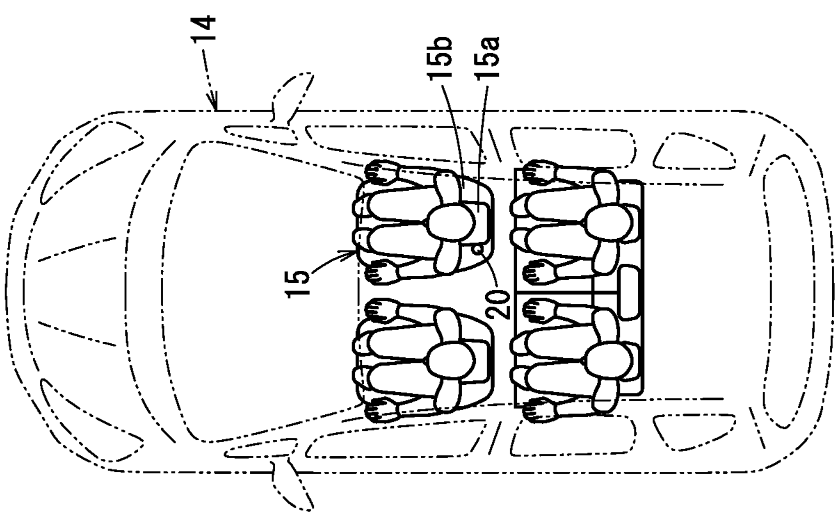

The microphone 20 is installed in the vehicle compartment 14 such that it is easily detachable by a user. FIGS. 3A and 3B are views showing an example of the installation position of the microphone 20 in the vehicle compartment 14. If the vehicle 12 is a right-hand drive vehicle, the microphone 20 is fixed to the left side surface (vehicle center side) of a headrest 15*a* of a driver's seat 15 with a double-sided tape or the like, as shown in FIG. 3A.

The position where the microphone 20 is set is not limited to the position shown in FIG. 3A. For example, as shown in FIG. 3B, the microphone 20 may be fixed to the left side surface (vehicle center side) of a seat back 15*b* of the driver's seat 15 by a double-sided tape or the like. If the automobile 12 is a left-hand drive vehicle, the microphone 20 is provided on a right side surface of the headrest 15*a* or the seat back 15*b* of the driver's seat 15.

Returning to FIG. 2, the smartphone 22 includes an operation processing device 29, a memory 30, a storage 31, a microphone 32, a display 34, a touch panel 36, an acceleration sensor 37, a mobile communication module 38, a wireless LAN communication module 40, and a short-range (near field) wireless communication module 42. The acceleration sensor 37 corresponds to an acceleration detecting unit according to the present invention.

The operation processing device 29 is, for example, a processor such as a central processing unit (CPU) or a microprocessing unit (MPU). The memory 30 is, for example, a non-transitory or transitory tangible computer-readable recording medium such as a ROM or a RAM. The storage 31 is, for example, a non-transitory tangible computer-readable recording medium such as a hard disk or a solid state drive (SSD).

When the active acoustic control program is installed on the smartphone 22, the active acoustic control program is stored in the storage 31. The smartphone 22 functions as the active acoustic control device 10 when the operation processing device 29 performs active acoustic control processing in accordance with the active acoustic control program stored in the storage 31.

The microphone 32 collects sounds around the smartphone 22. The display 34 is, for example, a display device using liquid crystal, organic electroluminescence (organic EL), or the like. The touch panel 36 is a pointing device that detects a position on the display 34 touched by a user's finger or the like. The acceleration sensor 37 detects the acceleration acting on the smartphone 22. When the smartphone 22 is in the vehicle compartment 14, the acceleration detected by the acceleration sensor 37 can be regarded as the acceleration of the vehicle 12.

The mobile communication module 38 is a module that communicates with a base station 28*a* connected to the Internet 28 by cellular communication. The wireless LAN communication module 40 is a module that communicates with an access point 28*b* connected to the Internet 28 by wireless LAN communication such as Wi-Fi (registered trademark). Thus, the smartphone 22 can transmit and receive data to and from the server 26 via the Internet 28.

The short-range wireless communication module 42 is a module that communicates with the in-vehicle system 24 by short-range wireless communication such as Bluetooth (registered trademark).

The in-vehicle system 24 includes an operation processing device 43, a memory 44, a sound source 45, a display 46, a touch panel 48, a short-range wireless communication module 50, and an amplifier 53.

The operation processing device 43 is, for example, a processor such as a central processing unit (CPU) or a microprocessing unit (MPU). The memory 44 is a non-transitory or transitory tangible computer-readable recording medium such as a ROM or a RAM. The sound source 45 is, for example, a non-transitory tangible computer-readable recording medium such as a hard disk or a solid state drive (SSD), and stores information such as music or guidance voices for car navigation.

The display 46 is, for example, a display device using liquid crystal, organic electroluminescence (organic EL), or the like. The touch panel 48 is a pointing device that detects a position on the display 46 touched by a user's finger or the like. The short-range wireless communication module 50 is, for example, a module that communicates with the engine rotational speed sensor 19, the smartphone 22, and the like by short-range wireless communication such as Bluetooth (registered trademark). Instead of wireless communication, wired communication such as USB may be used for communication with the engine rotational speed sensor 19, the smartphone 22, and the like.

The in-vehicle system 24 is connected to the speaker 16 via the amplifier 53. The in-vehicle system 24 and the speaker 16 are connected by wire. The in-vehicle system 24 and the speaker 16 may be wirelessly connected to each other. The operation processing device 43 outputs a sound source signal for outputting music or voices stored in the sound source 45 from the speaker 16. The sound source signal is amplified by the amplifier 53 and output to the speaker 16. The operation processing device 43 transmits the control signal u0 transmitted from the smartphone 22 (active acoustic control device 10) to the amplifier 53. The control signal u0 may be directly transmitted from the smartphone 22 (active acoustic control device 10) to the amplifier 53. The control signal u0 is amplified by the amplifier 53 and output to the speaker 16. Thus, the canceling sound for canceling the noise is output from the speaker 16 together with the music and voices of the sound source.

[Active Acoustic Control Device]

Figure 4:
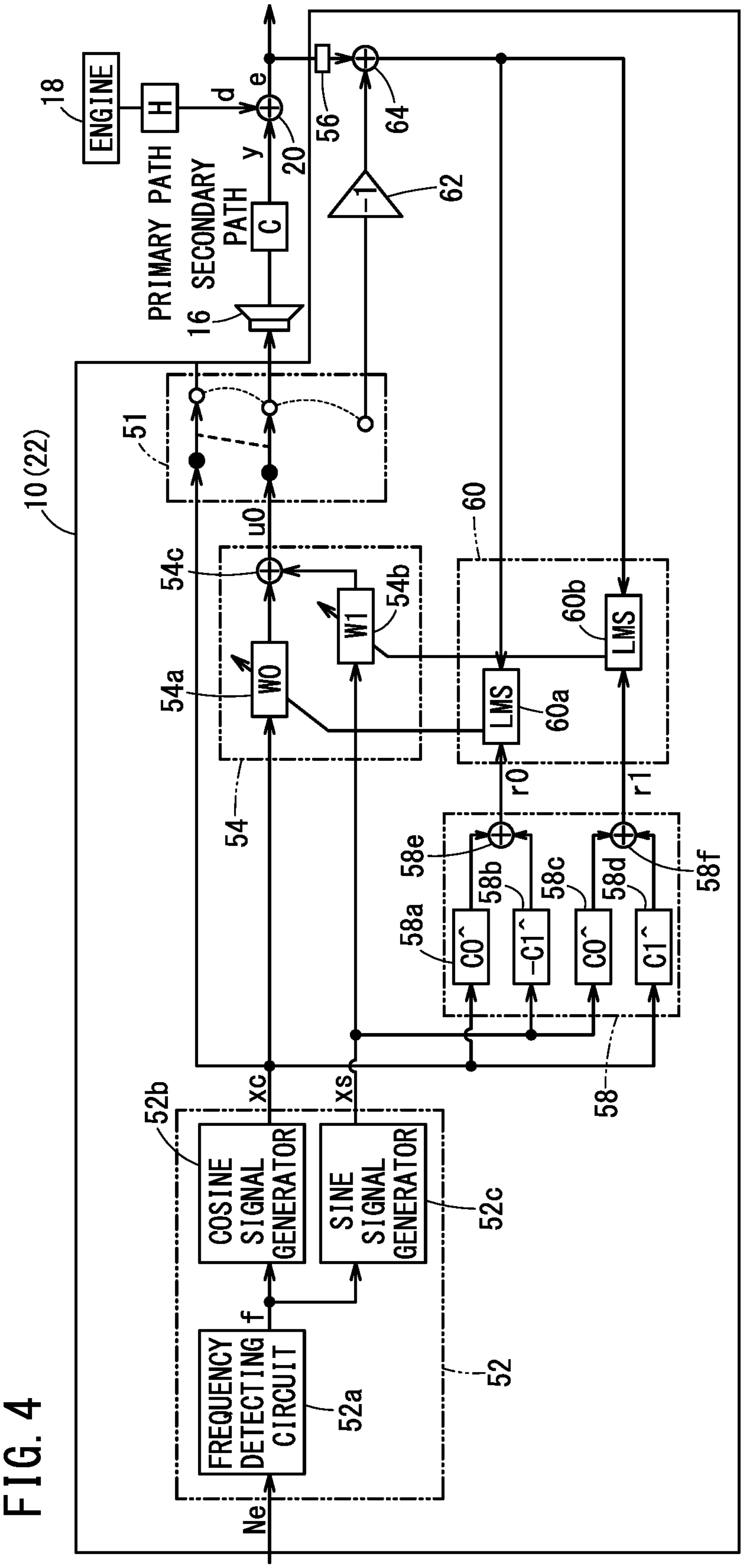
FIG. 4 is a block diagram of an active acoustic control device.
Figure 5:
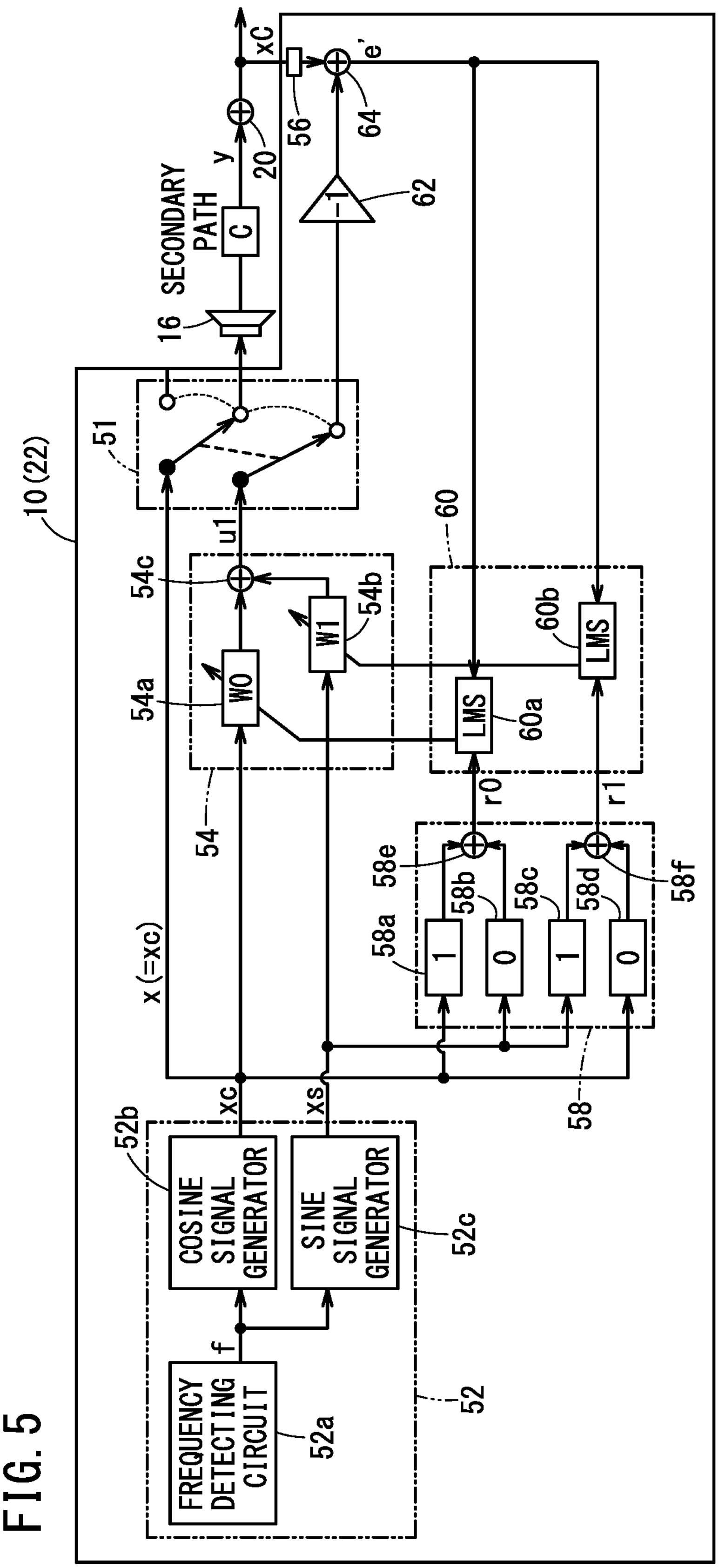
FIG. 5 is a block diagram of the active acoustic control device.

FIGS. 4 and 5 are block diagrams of the active acoustic control device 10. In the active acoustic control device 10, a SAN (Single-frequency Adaptive Notch) filter, which is a notch filter, is used as an adaptive digital filter. A filtered-X LMS (Least Mean Square) algorithm is used to update the coefficients of the SAN filter. The active acoustic control device 10 according to the present embodiment performs active noise control as active acoustic control. Before performing an active noise control process (hereinafter referred to as an ANC processing), the active acoustic control device 10 of the present embodiment performs identification processing of identifying a transfer characteristic C (hereinafter referred to as a secondary path transfer characteristic C) of sound in a transfer path (hereinafter referred to as a secondary path) from the speaker 16 to the microphone 20. Hereinafter, the active noise control performed by the active acoustic control device 10 of the present embodiment will be referred to as active noise control of a prior identification type. Note that the transfer path from the speaker 16 to the microphone 20 is referred to as a secondary path, whereas the transfer path from the engine 18 to the microphone 20 is referred to as a primary path below.

FIG. 4 shows a block diagram of the active acoustic control device 10 during the ANC process. FIG. 5 shows a block diagram of the active acoustic control device 10 during the identification process. The active acoustic control device 10 switches between the ANC processing and the identification processing by a processing switching unit 51.

(ANC Processing)

Signal processing performed by the active acoustic control device 10 during the ANC processing will be described with reference to FIG. 4. The active acoustic control device 10 includes a basic signal generating unit 52, a control signal generating unit 54, an error signal input unit 56, a reference signal generating unit 58, and a control filter coefficient updating unit 60. The control signal generating unit 54 corresponds to an adaptive notch filter of the present invention, and the control filter coefficient updating unit 60 corresponds to a filter coefficient updating unit and an identifying unit according to the present invention.

The basic signal generating unit 52 generates basic signals xc and xs based on the engine rotational speed Ne. The basic signal generating unit 52 includes a frequency detecting circuit 52*a*, a cosine signal generator 52*b*, and a sine signal generator 52*c*.

The frequency detecting circuit 52*a* detects a vibration frequency f that is a fundamental frequency of noise (muffled sound) generated in synchronization with rotation of an output shaft of the engine 18. The muffled sound of the engine 18 is a vibration radiation sound generated by transmitting an exciting force generated by the rotation of the engine 18 to the vehicle body, and thus is a vibration noise having a remarkable frequency characteristic synchronized with the rotational speed of the engine 18. For example, in the case where the engine 18 is a 4-cycle 4-cylinder engine, an excitation vibration with the engine 18 as a base point occurs, due to a torque fluctuation caused by gas combustion occurring every ½ rotation of the output shaft of the engine 18. As a result, noise is generated in the vehicle compartment 14.

The vibration frequency f is detected based on the engine rotational speed Ne. The engine rotational speed Ne can be converted into a rotational frequency fe by a following equation.

$$fe[\mathrm{Hz}]=Ne[\mathrm{rpm}]/60\ [\mathrm{sec}]$$

For example, in the case that the engine rotational speed Ne is 6000 [rpm], the rotational frequency fe is 100 [Hz].

In the case that the engine 18 is a four-cycle engine, ignition is performed once per two rotations in each cylinder. For example, if the engine rotational speed Ne is 6000 [rpm] in the four-cylinder engine 18, the vibration frequency f is as follows.

$$f[\mathrm{Hz}]=100[\mathrm{Hz}]\times\frac{1}{2}\times 4=200$$

That is, the vibration frequency f of the four-cylinder engine 18 has a secondary component of the rotational frequency fe. FIG. 6 is a table showing orders of components of the vibration frequency f corresponding to the number of cylinders of the engine 18. The vibration frequency f can be obtained by multiplying the rotational frequency fe by an order corresponding to the number of cylinders of the engine 18.

The cosine signal generator 52*b* generates a basic signal xc (=cos(2πft)) which is a cosine signal of the vibration frequency f. The sine signal generator 52*c* generates a basic signal xs (=sin(2πft)), which is a sine signal of the vibration frequency f. Here, t denotes time.

The control signal generating unit 54 generates a control signal u0 based on the basic signals xc and xs. The control signal generating unit 54 corresponds to an adaptive notch filter according to the present invention. The control signal generating unit 54 includes a first control filter 54*a*, a second control filter 54*b*, and an adder 54*c*.

In the control signal generating unit 54, a SAN filter is used as a control filter.

The first control filter 54*a* has a filter coefficient W0. The second control filter 54*b* has a filter coefficient W1. The filter coefficients W0 and W1 are optimized by being adaptively updated by the control filter coefficient updating unit 60 described later.

The basic signal xc filtered by the first control filter 54*a* and the basic signal xs filtered by the second control filter 54*b* are added by the adder 54*c* to generate the control signal u0. The speaker 16 is controlled based on the control signal u0, and the canceling sound is output from the speaker 16.

The reference signal generating unit 58 generates reference signals r0 and r1 based on the basic signals xc and xs. The reference signal generating unit 58 includes a first secondary path filter 58*a*, a second secondary path filter 58*b*, a third secondary path filter 58*c*, a fourth secondary path filter 58*d*, an adder 58*e*, and an adder 58*f*.

In the reference signal generating unit 58, a notch filter is used as a secondary path filter. A coefficient C^ of the secondary path filter (hereinafter, referred to as a secondary path filter coefficient C^) is obtained in an identification processing described below.

The first secondary path filter 58*a* has a secondary path filter coefficient C0^ that is a real part of the secondary path filter coefficient C^ (=C0^+iC1^). The second secondary path filter 58*b* has a filter coefficient −C1^ obtained by inverting the polarity of the imaginary part of the secondary path filter coefficient C^. The third secondary path filter 58*c* has filter a coefficient C0^ which is a real part of the secondary path filter coefficient C^. The fourth secondary path filter 58*d* has a filter coefficient C1^ which is an imaginary part of the secondary path filter coefficient C^.

The basic signal xc filtered by the first secondary path filter 58*a* and the basic signal xs filtered by the second secondary path filter 58*b* are added by the adder 58*e* to generate a reference signal r0. The basic signal xs filtered by the third secondary path filter 58*c* and the basic signal xc filtered by the fourth secondary path filter 58*d* are added by the adder 58*f* to generate a reference signal r1.

That is, by the reference signal generating unit 58, the reference signals r0 and r1 are generated by correcting the basic signals xc and xs based on the secondary path filter coefficient C^ that is the correction value.

The error signal input unit 56 inputs the error signal e corresponding to the cancellation error noise collected by the microphone 20. The cancellation error noise is a sound obtained by synthesizing the noise d input to the microphone 20 and the canceling sound y input to the microphone 20. The error signal input unit 56 may input the error signal e corresponding to the cancellation error noise collected by the microphone 32 mounted on the smartphone 22.

The control filter coefficient updating unit 60 updates the filter coefficients W0 and W1 of the control signal generating unit 54 based on the reference signals r0 and r1 and the error signal e. The control filter coefficient updating unit 60 adaptively updates the filter coefficients W0 and W1 based on the filtered-X LMS algorithm. The control filter coefficient updating unit 60 includes a first control filter coefficient updating unit 60*a* and a second control filter coefficient updating unit 60*b*.

The first control filter coefficient updating unit 60*a* and the second control filter coefficient updating unit 60*b* update the filter coefficients W0 and W1 based on the following equations. In the equations, n denotes a time step (n=0, 1, 2, . . . ), and μ0 and μ1 denote step size parameters.

$$W0(n+1)=W0(n)-\mu 0\times e(n)\times\{C0\hat{}(n)\times xc(n)-C1\hat{}(n)\times xs(n)\}$$

$$W1(n+1)=W1(n)-\mu 1\times e(n)\times\{C0\hat{}(n)\times xs(n)+C1\hat{}(n)\times xc(n)\}$$

The filter coefficients W0 and W1 are optimized by repeatedly updating the filter coefficients W0 and W1 by the control filter coefficient updating unit 60. In the active acoustic control device 10 using the SAN filter, the update equations for the filter coefficients W0 and W1 are configured by four arithmetic operations and do not include a convolution operation. Therefore, it is possible to suppress a computational load due to update processing of filter coefficients W0 and W1.

(Identification Processing)

Signal processing performed during the identification processing by the active acoustic control device 10 will be described with reference to FIG. 5.

In the identification processing, identification sounds of predetermined frequencies fm (=f0, f1, . . . , fm−1) are output from the speaker 16, and the secondary path transfer characteristic C at that time is identified. White noise, pink noise, or sine sweep is used as an identification sound.

In the identification processing, the secondary path transfer characteristic C of each predetermined frequency fm is identified as a secondary path filter coefficient C^. The identification processing is performed when the engine 18 is stopped. During the identification processing, the filter coefficient of the first secondary path filter 58*a* is fixed to 1, the filter coefficient of the second secondary path filter 58*b* is fixed to 0, the filter coefficient of the third secondary path filter 58*c* is fixed to 1, and the filter coefficient of the fourth secondary path filter 58*d* is fixed to 0.

The frequency detecting circuit 52*a* outputs predetermined frequencies fm (=f0, f1, . . . , fm−1). The cosine signal generator 52*b* generates the basic signal xc which is a cosine signal having the predetermined frequency fm. The sine signal generator 52*c* generates the basic signal xs which is a sine signal having the predetermined frequency fm.

The basic signal xc is output as an identification signal x. The speaker 16 is controlled based on the identification signal x and an identification sound is output from the speaker 16.

The error signal input unit 56 inputs a noise signal xC corresponding to the identification sound collected by the microphone 20. The noise signal xC is input to an adder 64.

The basic signal xc filtered by the first control filter 54*a* and the basic signal xs filtered by the second control filter 54*b* are added by the adder 54*c* to generate the control signal u1. The polarity of the control signal u1 is inverted by an inverter 62, and the inverted signal is input to the adder 64. The adder 64 generates a virtual error signal e' which is a difference between the noise signal xC and the control signal u1.

The control filter coefficient updating unit 60 adaptively performs signal processing on the filter coefficients W0 and W1 of the control signal generating unit 54 based on the reference signals r0 and r1 and the virtual error signal e'.

The first control filter coefficient updating unit 60a and the second control filter coefficient updating unit 60b update the filter coefficients W0 and W1 based on the following equations.

$$W0(n+1)=W0(n)-\mu 0\times e'(n)\times xc(n)$$

$$W1(n+1)=W1(n)-\mu 1\times e'(n)\times xs(n)$$

In the identification processing, the frequency detecting circuit 52a sweeps the predetermined frequencies fm, and the control filter coefficient updating unit 60 adaptively updates the filter coefficients W0 and W1 for a predetermined time at each of the predetermined frequencies fm. The adaptively updated filter coefficient W0 is recorded as the filter coefficient C0^ for each of the predetermined frequencies fm, and the adaptively updated filter coefficient W1 is recorded as the filter coefficient C1^ for each of the predetermined frequencies fm. FIG. 7 is a table showing values of control filter coefficients C0^ and C1^ corresponding to respective predetermined frequencies f0, f1, . . . , fa−1. The control filter coefficient updating unit 60 during the identification processing corresponds to an identifying unit according to the present invention.

[Active Noise Control Processing in Smartphone]

Figure 8A:
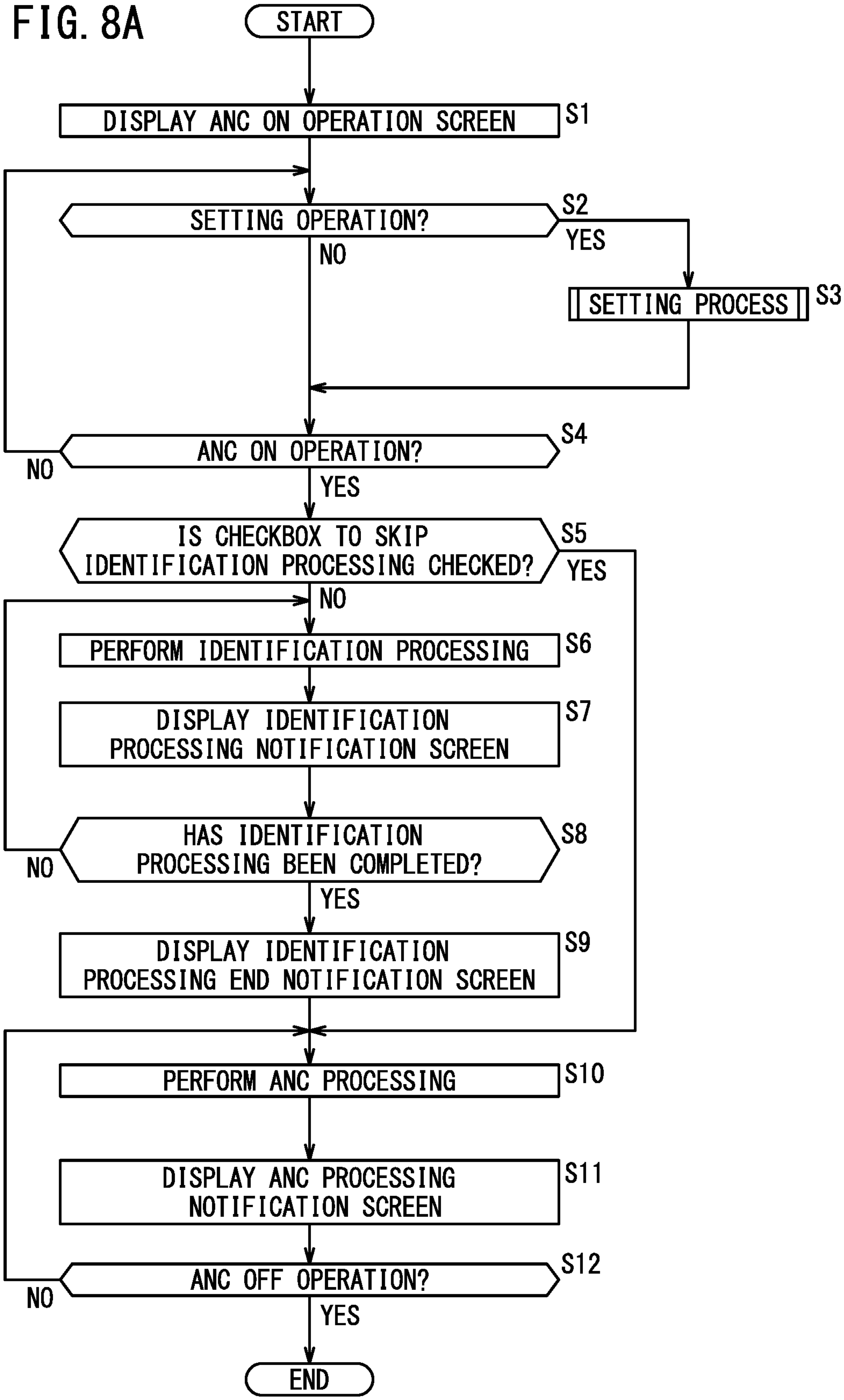
FIG. 8A is a flowchart illustrating the flow of an active noise control process.

FIG. 8A is a flowchart showing the flow of active noise control processing in the smartphone 22.

Figure 9:
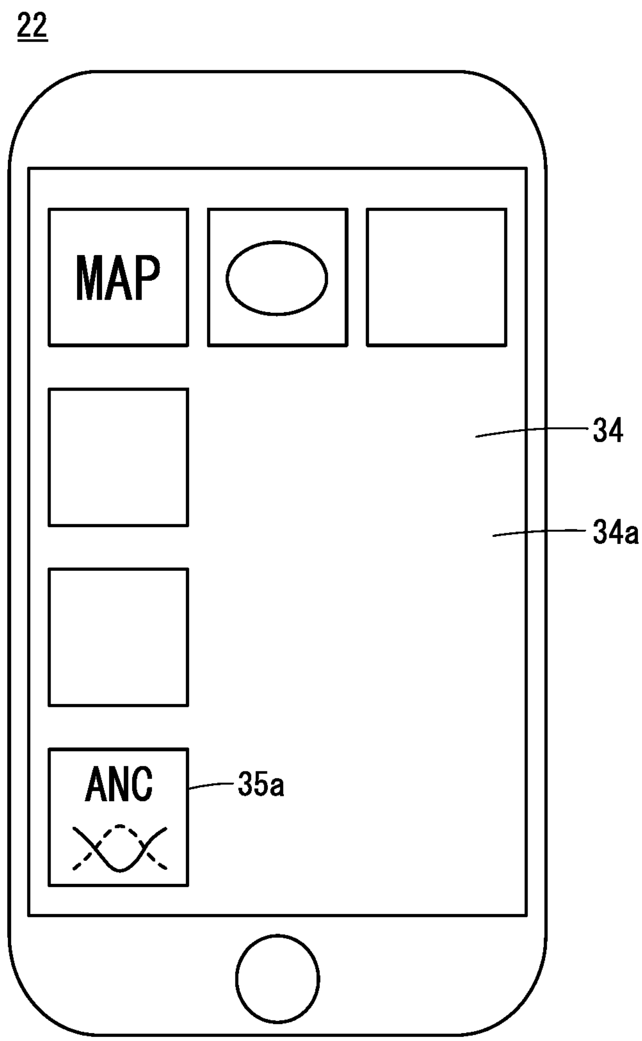
FIG. 9 is a diagram illustrating a smartphone.

When the active acoustic control program is installed on the smartphone 22, the active acoustic control application can be used in the smartphone 22. FIG. 9 is a diagram illustrating the smartphone 22 in which an initial screen 34a is displayed on the display 34. When the active acoustic control program is installed on the smartphone 22, an icon 35a of the active acoustic control application is displayed in the initial screen 34a. When the user taps the icon 35a, the active acoustic control application is activated, and the operation processing device 29 performs active noise control processing. The active noise control processing is repeatedly performed with a predetermined period until an ANC OFF operation, which will be described later, is performed by the user.

Figure 10:
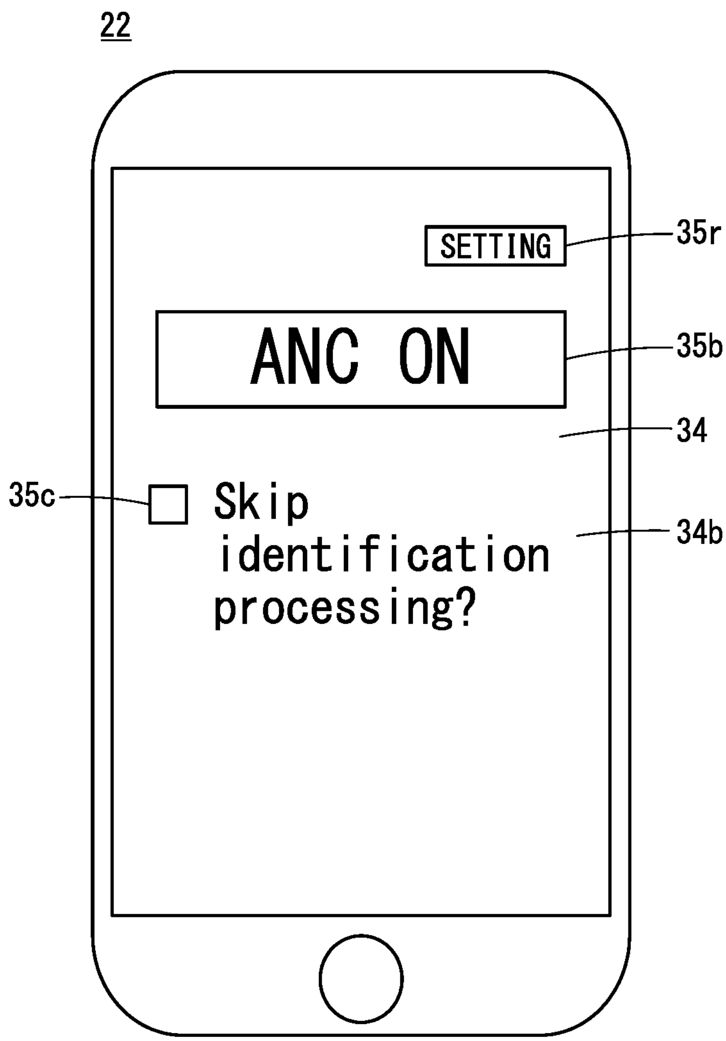
FIG. 10 is a diagram illustrating the smartphone.

In step S1, the operation processing device 29 displays an ANC ON operation screen 34b on the display 34, and the process proceeds to step S2. FIG. 10 is a diagram illustrating the smartphone 22 in which the ANC ON operation screen 34b is displayed on the display 34. The ANC ON operation screen 34b includes an ANC ON button 35b, a checkbox 35c, and a setting button 35r.

In step S2, the operation processing device 29 determines whether or not a setting operation has been performed by the user. If the setting operation has been performed, the process proceeds to step S3, and if the setting operation has not been performed, the process proceeds to step S4. If the user taps the setting button 35r, the operation processing device 29 determines that a setting operation has been performed by the user.

In step S3, the operation processing device 29 performs setting process to be described later, and the process proceeds to step S4.

In step S4, the operation processing device 29 determines whether or not an ANC ON operation has been performed by the user. If the ANC ON operation has been performed, the process proceeds to step S5, and if the ANC ON operation has not been performed, the process returns to step S2. If the user taps the ANC ON button 35b, the operation processing device 29 determines that the ANC ON operation has been performed by the user.

In step S5, the operation processing device 29 determines whether or not a checkbox to skip identification processing is checked. If the checkbox to skip identification processing is checked, the process proceeds to step S10, and if the checkbox to skip identification processing is not checked, the process proceeds to step S6. In the ANC ON operation screen 34b of FIG. 10, if the user taps the checkbox 35c to check and then taps the ANC ON button 35b, the operation processing device 29 determines that the checkbox to skip the identification processing is checked.

In step S6, the operation processing device 29 performs the identification processing, and the process proceeds to step S7.

Figure 11:
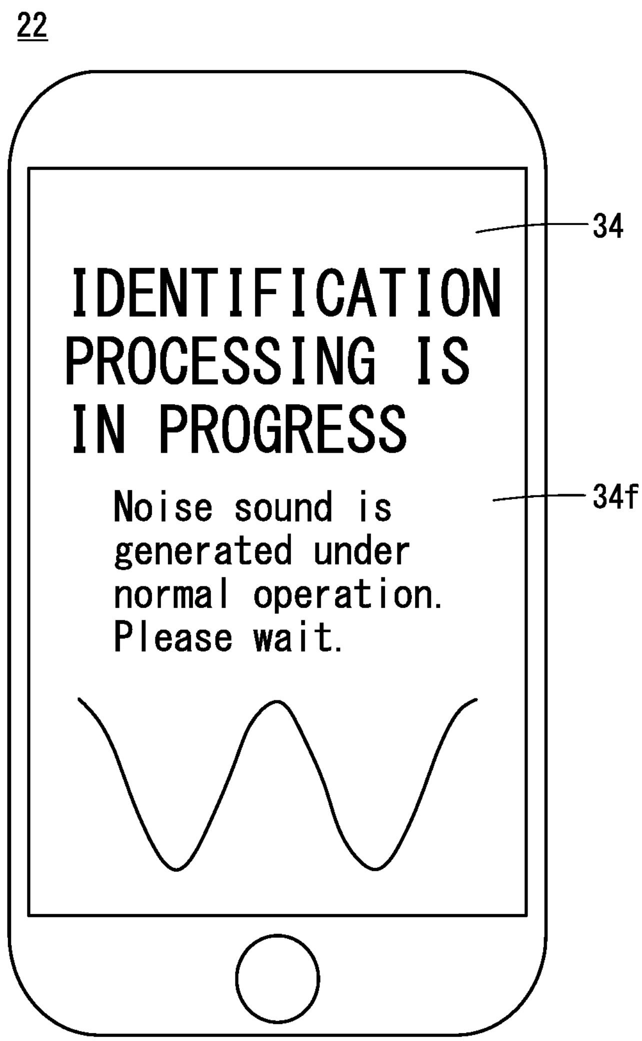
FIG. 11 is a diagram illustrating the smartphone.

In step S7, the operation processing device 29 displays an identification processing notification screen 34f on the display 34, and the process proceeds to step S8. FIG. 11 is a diagram illustrating the smartphone 22 in which the identification processing notification screen 34f is displayed on the display 34. In the identification processing notification screen 34f, a message is displayed to inform the user that the identification processing is in progress and that a noise sound is generated. As a result, a sense of discomfort or anxiety to the user caused by the generation of the noise sound is suppressed.

In step S8, the operation processing device 29 determines whether or not the identification processing has been completed. If the identification processing is completed, the process proceeds to step S9, and if the identification processing is not completed, the process returns to step S6.

Figure 12:
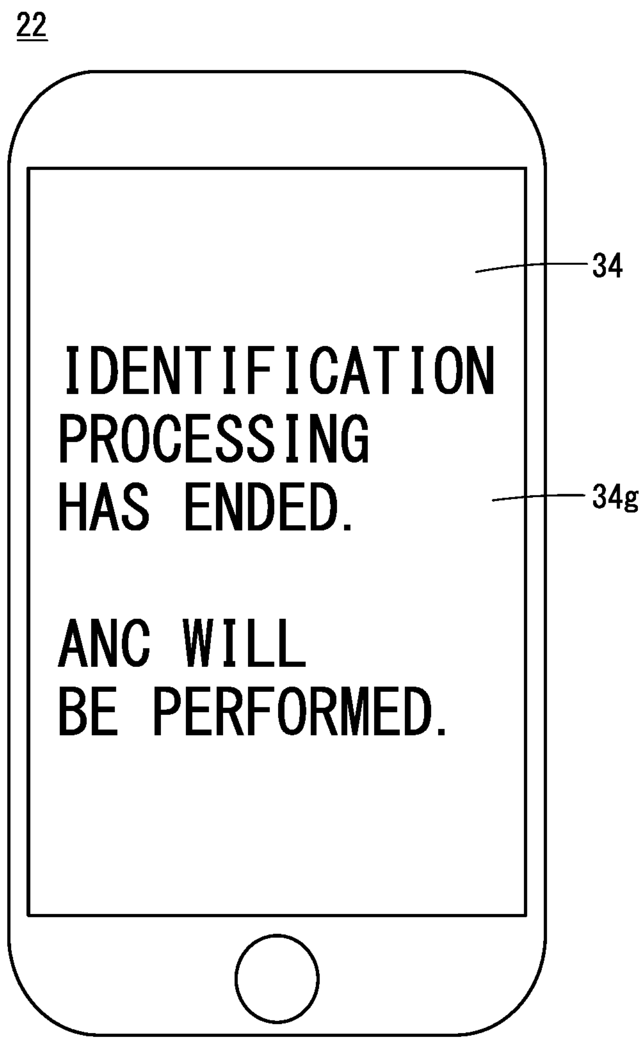
FIG. 12 is a diagram illustrating the smartphone.

In step S9, the operation processing device 29 displays an identification processing end notification screen 34g on the display 34, and the process proceeds to step S10. FIG. 12 is a diagram illustrating the smartphone 22 in which the identification processing end notification screen 34g is displayed on the display 34. On the identification processing end notification screen 34g, a message is displayed to notify the user that the identification processing has ended and that the ANC processing will be performed.

In step S10, the operation processing device 29 performs the ANC processing, and the process proceeds to step S11.

Figure 13:
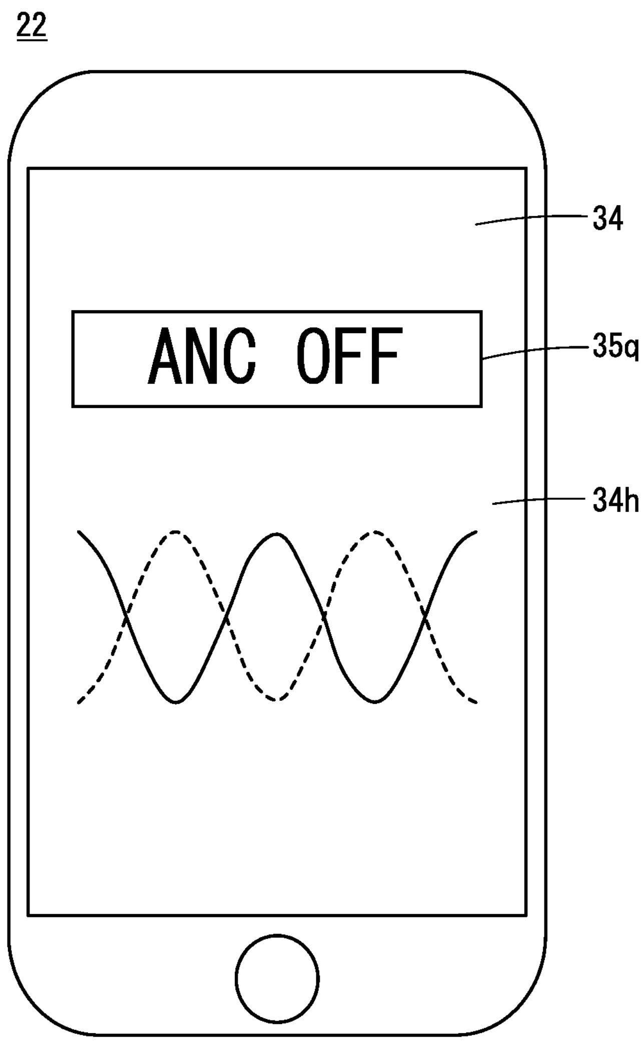
FIG. 13 is a diagram illustrating the smartphone.

In step S11, the operation processing device 29 displays an ANC processing notification screen 34h on the display 34, and the process proceeds to step S12. FIG. 13 is a diagram illustrating the smartphone 22 in which the ANC processing notification screen 34h is displayed on the display 34. On the ANC processing notification screen 34h, an image for notifying the user that the ANC processing is being performed is displayed. Further, an ANC OFF button 35q is displayed on the ANC processing notification screen 34h.

In step S12, the operation processing device 29 determines whether or not an ANC OFF operation has been performed. If the ANC OFF operation is performed, the active noise control processing is terminated. If the ANC OFF operation is not performed, the process returns to step S10. If the user taps the ANC OFF button 35q, the operation processing device 29 determines that the ANC OFF operation is performed by the user.

Figure 8B:
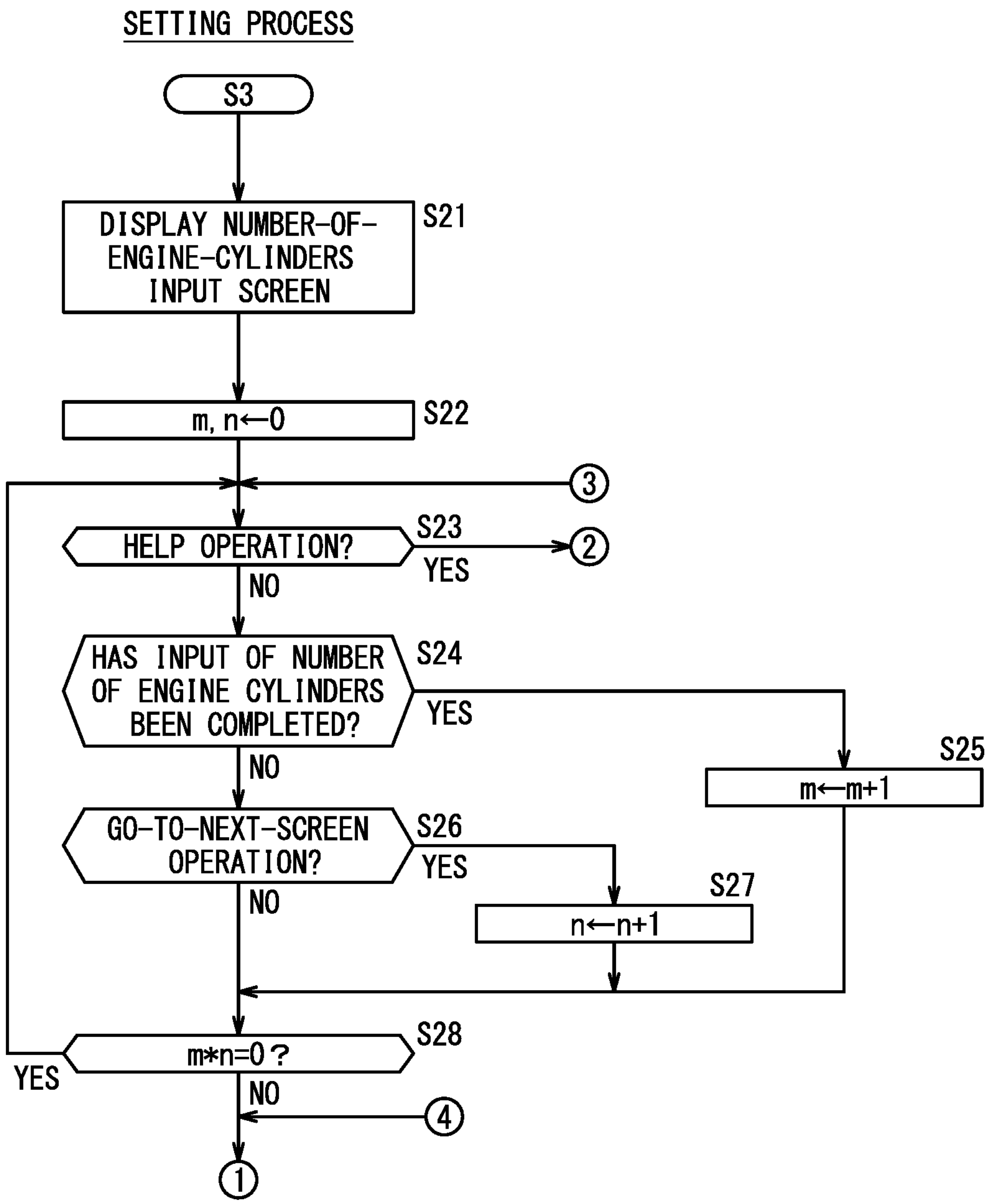
FIG. 8B is a flowchart illustrating the flow of a setting process.
Figure 8C:
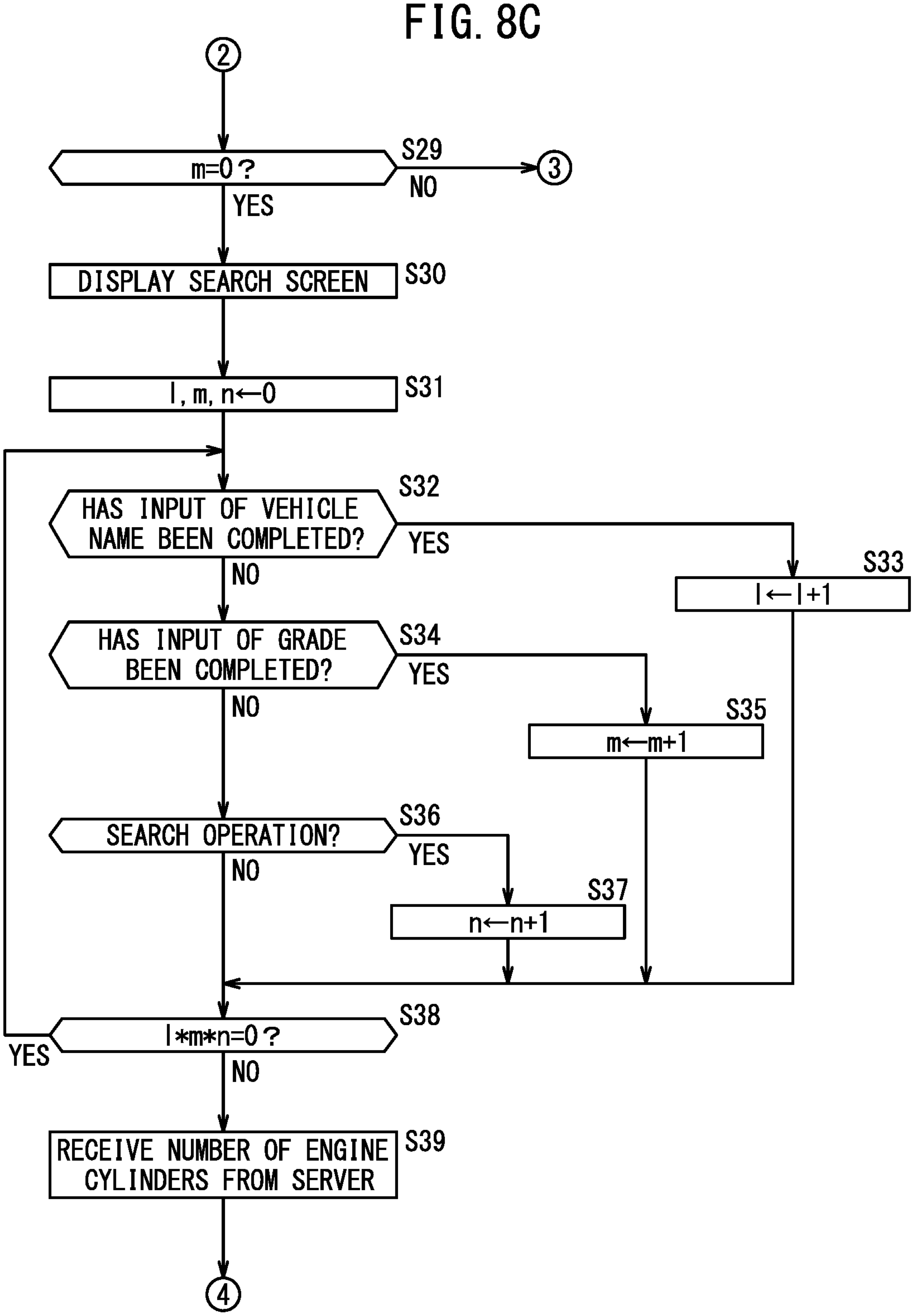
FIG. 8C is a flowchart illustrating the flow of the setting process.
Figure 8D:
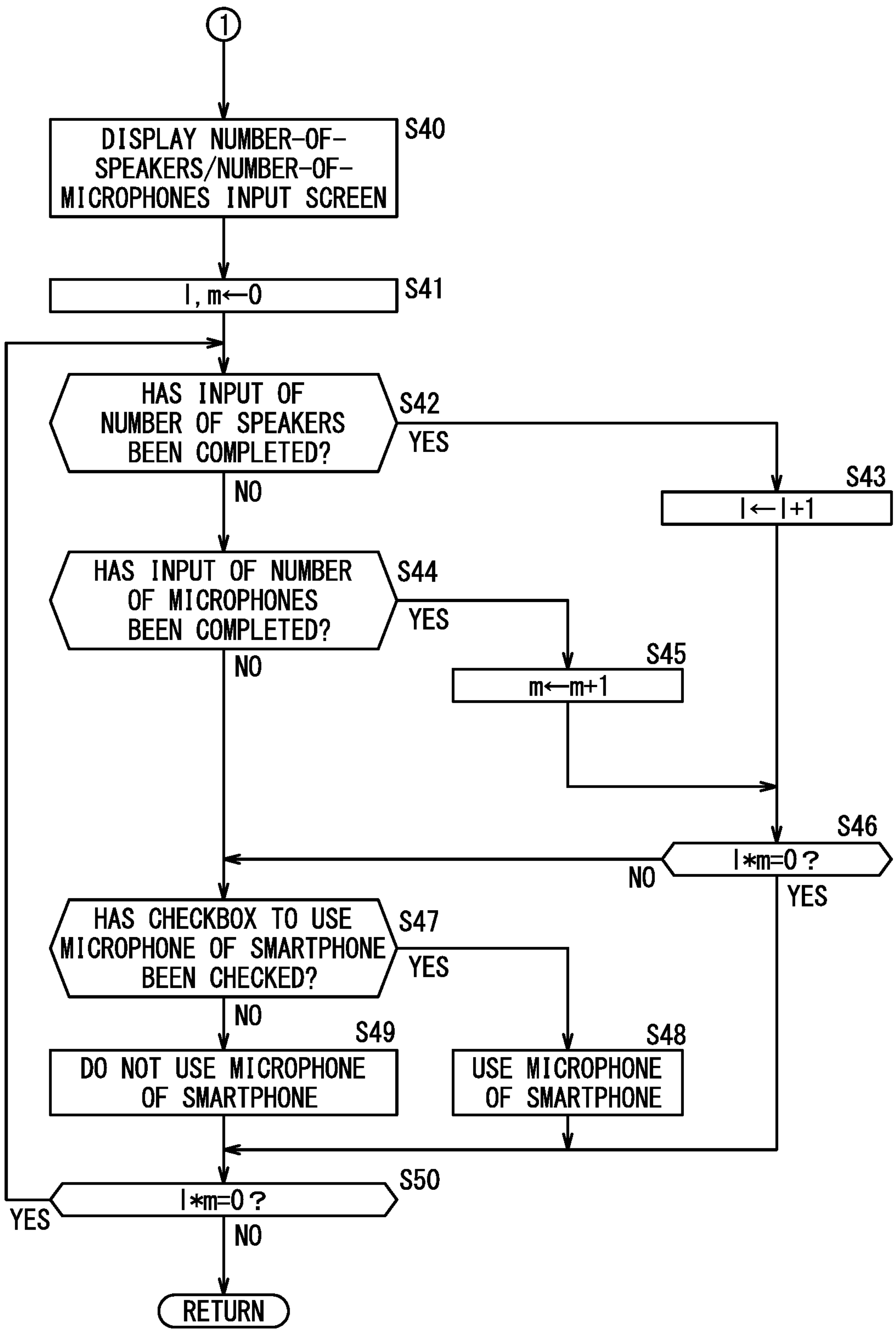
FIG. 8D is a flowchart illustrating the flow of the setting process.

FIG. 8B, FIG. 8C and FIG. 8D are flowcharts illustrating the flow of a setting process performed in step S3. As described above, the setting process is performed if the user taps the setting button 35r illustrated in FIG. 10 and performs a setting operation. For example, the setting operation is performed when the active acoustic control application is activated for the first time after the active noise control program is installed on the smartphone 22, or when the number of microphones 20 is changed, or when a vehicle is replaced, or the like.

Figure 14:
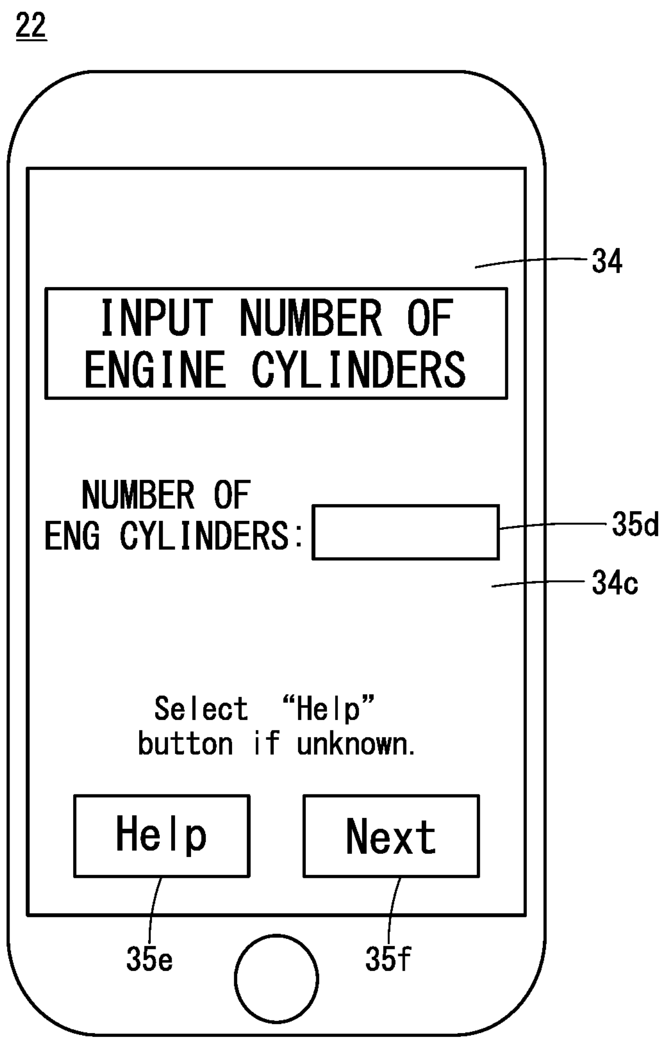
FIG. 14 is a diagram illustrating the smartphone.

In step S21, the operation processing device 29 displays a number-of-engine-cylinders input screen 34*c* on the display 34, and the process proceeds to step S22. FIG. 14 is a diagram illustrating the smartphone 22 in which the number-of-engine-cylinders input screen 34*c* is displayed on the display 34. The number-of-engine-cylinders input screen 34*c* includes a number-of-engine-cylinders input section 35*d*, a help button 35*e*, and a go-to-next-screen button 35*f*.

In step S22, the operation processing device 29 inputs 0 for an argument m and an argument n, and proceeds to step S23.

In step S23, the operation processing device 29 determines whether or not a help operation has been performed. If the help operation is performed, the process proceeds to step S29, and if the help operation is not performed, the process proceeds to step S24. If the user taps the help button 35*e*, the operation processing device 29 determines that the help operation has been performed by the user.

In step S24, the operation processing device 29 determines whether or not the input of the number of cylinders of the engine 18 for the number-of-engine-cylinders input section 35*d* by the user has been completed. If the input of the number of cylinders of the engine 18 has been completed, the process proceeds to step S25, and if the input has not been completed, the process proceeds to step S26.

In step S25, the operation processing device 29 increments the argument m, that is, increases the numerical value of the argument m by 1, and proceeds to step S28.

In step S26, the operation processing device 29 determines whether or not a go-to-next-screen operation is performed by the user. If the go-to-next-screen operation is performed, the process proceeds to step S27, and if the go-to-next-screen operation is not performed, the process proceeds to step S28. When the user taps the go-to-next-screen button 35*f*, the operation processing device 29 determines that the go-to-next-screen operation is performed by the user.

In step S27, the operation processing device 29 increments the argument n, and the process proceeds to step S28.

In step S28, the operation processing device 29 determines whether or not the product of the argument m and the argument n is 0. If the product of the argument m and the argument n is 0, the process returns to step S23, and if the product of the argument m and the argument n is not 0, the process proceeds to step S40.

In step S29 to which the process proceeds if it is determined in step S23 that the help operation has been performed by the user, the operation processing device 29 determines whether or not the argument m is 0. If the argument m is 0, the process proceeds to step S30, and if the argument m is not 0, the process returns to step S23.

Figure 15:
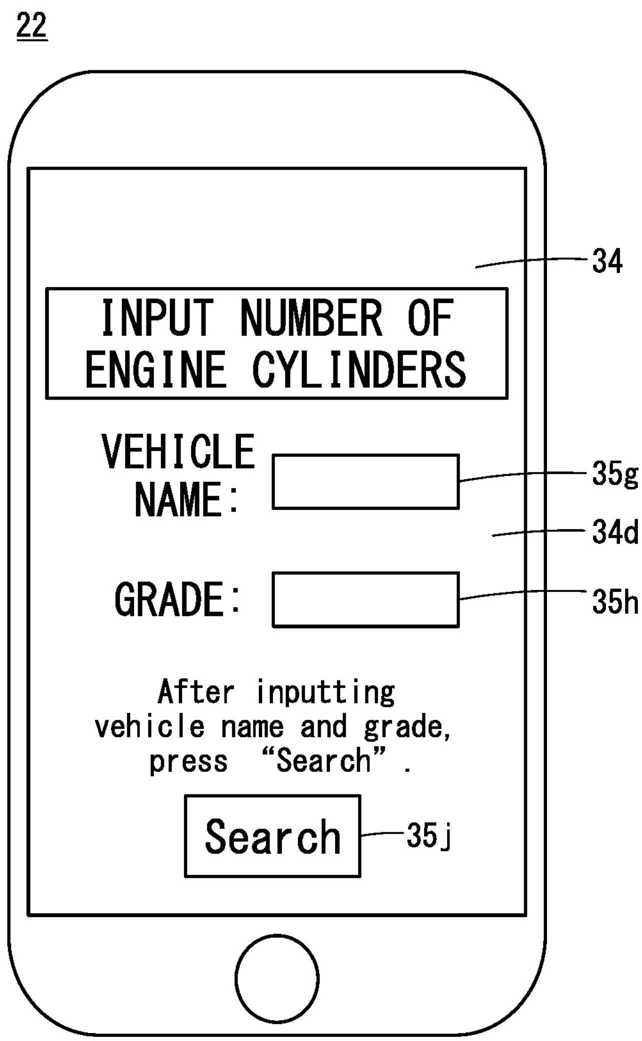
FIG. 15 is a diagram illustrating the smartphone.

In step S30, the operation processing device 29 displays a search screen 34*d* on the display 34, and proceeds to step S31. FIG. 15 is a diagram illustrating the smartphone 22 in which the search screen 34*d* is displayed on the display 34. The search screen 34*d* includes a vehicle name input section 35*g*, a grade input section 35*h*, and a search button 35*j*.

In step S31, the operation processing device 29 inputs 0 for an argument l, the argument m, and the argument n, respectively, and then proceeds to step S32.

In step S32, the operation processing device 29 determines whether or not the input of the vehicle name for the vehicle name input section 35*g* by the user has been completed. If the input of the vehicle name has been completed, the process proceeds to step S33, and if the input has not been completed, the process proceeds to step S34.

In step S33, the operation processing device 29 increments the argument l, and the process proceeds to step S38.

In step S34, the operation processing device 29 determines whether or not the input of the grade for the grade input section 35*h* by the user has been completed. If the input of the grade has been completed, the process proceeds to step S35, and if the input has not been completed, the process proceeds to step S36.

In step S35, the operation processing device 29 increments the argument m, and the process proceeds to step S38.

In step S36, the operation processing device 29 determines whether or not the search operation has been performed by the user. If the search operation has been performed, the process proceeds to step S37, and if the search operation has not been performed, the process proceeds to step S38. If the user taps the search button 35*j*, the operation processing device 29 determines that the search operation has been performed by the user.

In step S37, the operation processing device 29 increments the argument n, and the process proceeds to step S38.

In step S38, the operation processing device 29 determines whether or not the product of the argument l, the argument m, and the argument n is 0. If the product of the argument l, the argument m, and the argument n is 0, the process returns to step S32, and if the product of the argument l, the argument m, and the argument n are not 0, the process proceeds to step S39.

In step S39, the operation processing device 29 receives the number of cylinders of the engine 18 corresponding to the input vehicle name and grade from the server 26, and proceeds to step S40.

Figure 16:
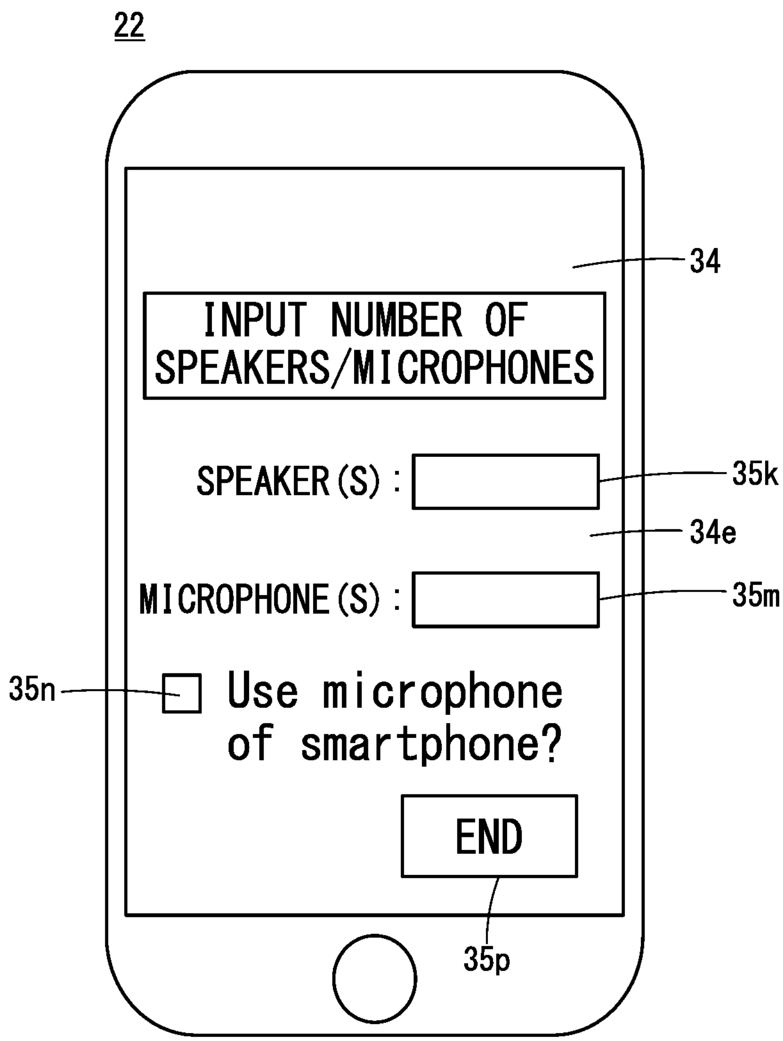
FIG. 16 is a diagram illustrating the smartphone.

In step S40, the operation processing device 29 displays number-of-speakers/number-of-microphones input screen 34*e* on the display 34, and the process proceeds to step S41. FIG. 16 is a diagram illustrating the smartphone 22 in which the number-of-speakers/number-of-microphones input screen 34*e* is displayed on the display 34. The number-of-speakers/number-of-microphones input screen 34*e* includes a number-of-speakers input section 35*k*, a number-of-microphones input section 35*m*, a checkbox 35*n*, and an end button 35*p*.

In step S41, the operation processing device 29 inputs 0 for the argument l and the argument m, and the process proceeds to step S42.

In step S42, it is determined whether or not the input of the number of speakers 16 for the number-of-speakers input section 35*k* by the user has been completed. If the input of the number of speakers 16 has been completed, the process proceeds to step S43, and if the input has not been completed, the process proceeds to step S44.

In step S43, the operation processing device 29 increments the argument l, and the process proceeds to step S46.

In step S44, the operation processing device 29 determines whether or not the input of the number of microphones 20 for the number-of-microphones input section 35*m* by the user has been completed. If the input of the number of microphones 20 has been completed, the process proceeds to step S45, and if the input has not been completed, the process proceeds to step S47.

In step S45, the operation processing device 29 increments the argument m, and the process proceeds to step S46.

In step S46, the operation processing device 29 determines whether or not the product of the argument l and the argument m is 0. If the product of the argument l and the argument m is 0, the process proceeds to step S50, and if the product of the argument l and the argument m is not 0, the process proceeds to step S47.

In step S47, the operation processing device 29 determines whether or not a checkbox to use the microphone 32 of the smartphone 22 has been checked by the user. If the checkbox to use the microphone 32 of the smartphone 22 is checked, the process proceeds to step S48, and if the checkbox to use the microphone 32 of the smartphone 22 is not checked, the process proceeds to step S49. If the user taps and checks the checkbox 35*n*, the operation processing device 29 determines that the checkbox to use the microphone 32 is checked.

In step S48, the operation processing device 29 determines to perform the active noise control process using the microphone 32 mounted on the smartphone 22, and the process proceeds to step S50.

In step S49, the operation processing device 29 determines not to perform the active noise control process using the microphone 32 mounted on the smartphone 22, and the process proceeds to step S50.

In step S50, the operation processing device 29 determines whether or not the product of the argument l and the argument m is 0. If the product of the argument l and the argument m is 0, the process returns to step S42, and if the product of the argument l, the argument m, and the argument n is not 0, the setting process is ended.

[Active Acoustic Control Device Using FIR Filter]

Hereinafter, an active acoustic control device 66 using an FIR filter will be described as a comparative example with respect to the active acoustic control device 10 using the SAN filter of the present embodiment.

Figure 17:
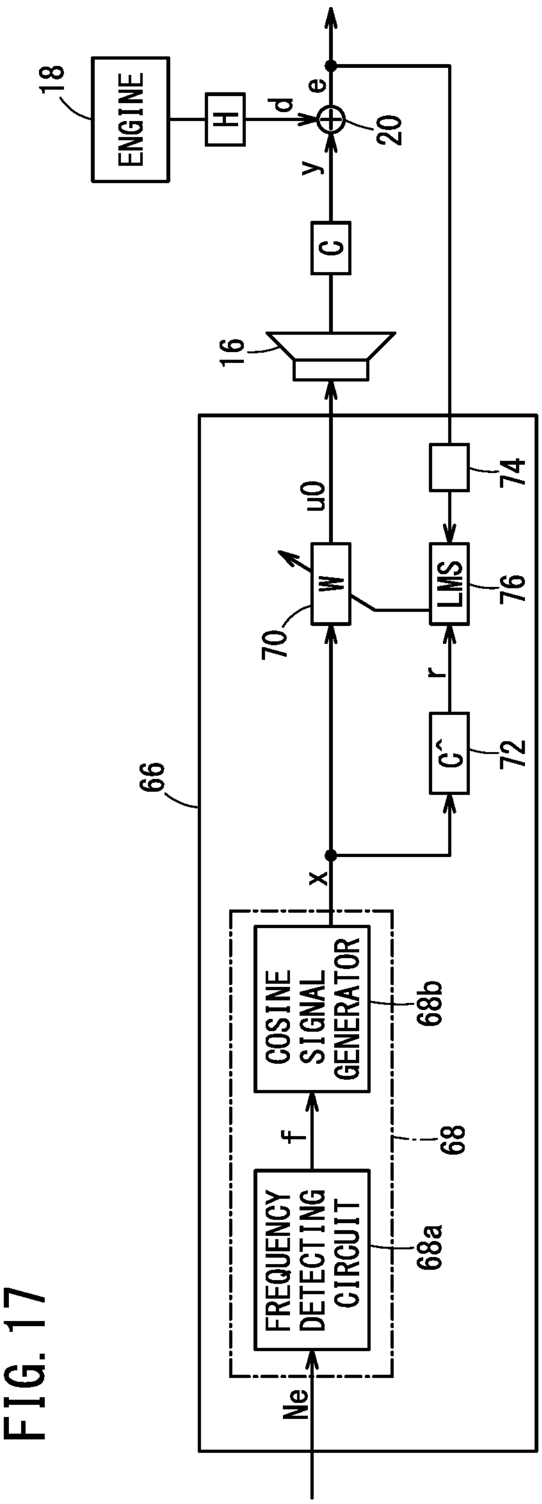
FIG. 17 is a block diagram of an active acoustic control device.

FIG. 17 is a block diagram of the active acoustic control device 66 using an FIR filter. In the active acoustic control device 66, an FIR (Finite Impulse Response) filter is used as an adaptive digital filter. A filtered-X LMS algorithm is used to update the filter coefficients of the FIR filter.

The active acoustic control device 66 includes a basic signal generating unit 68, a control signal generating unit 70, a reference signal generating unit 72, an error signal receiving unit 74, and a control filter coefficient updating unit 76.

The basic signal generating unit 68 generates a basic signal x based on the engine rotational speed Ne. The basic signal generating unit 68 includes a frequency detecting circuit 68*a* and a cosine signal generator 68*b*.

Similarly to the frequency detecting circuit 52*a* of the active acoustic control device 10 of the present embodiment, the frequency detecting circuit 68*a* detects the vibration frequency f of the engine 18 in accordance with the engine rotational speed Ne and the number of cylinders of the engine 18.

The cosine signal generator 68*b* generates a basic signal x (=cos(2πft)) which is a cosine signal of the vibration frequency f. Here, t denotes time. When the number of taps of the FIR filter is N, a time-series signal vector X(n) of a basic signal x(n) at a time step n is defined by the following equation.

$$X(n)=[x(n),x(n-1),x(n-2),\ldots x(n-N+1)]^T$$

The control signal generating unit 70 generates a control signal u0 based on the time-series signal vector X of the basic signal x. In the control signal generating unit 70, an FIR filter which is an adaptive filter is used as a control filter. The control filter coefficient W is optimized by being updated by the control filter coefficient updating unit 76 described later.

The control filter coefficient W(n) at the time step n is expressed by the following equation.

$$W(n)=[w_0(n),w_1(n),w_2(n),\ldots,w_{N-1}(n)]^T$$

The control signal u0(*n*) at time step n is expressed by the following equation: In the following equation, "*" indicates a convolution sum.

$$u0(n)=\Sigma_{i=0}^{N-1}w_i(n)\times x(n-i)=W(n)*X(n)=W(n)^T\times X(n)$$

Further, the time-series vector U0(*n*) is expressed by the following equation.

$$U0(n)=[u0(n),u0(n-1),u0(n-2),\ldots,u0(n-N+1)]^T$$

The basic signal x filtered by the control signal generating unit 70 is output as the control signal u0. The speaker 16 is controlled based on the control signal u0, and the canceling sound is output from the speaker 16.

The reference signal generating unit 72 generates a reference signal r based on the basic signal x. The reference signal generating unit 72 includes a secondary path filter. The value of the secondary path filter coefficient C^ is stored in the server 26 for each vehicle type, and is downloaded from the server 26 to the active acoustic control device 66. The secondary path filter coefficient C^(n) at time step n is expressed by the following equation:

$$C\hat{}(n)=[c_0\hat{}(n),c_1\hat{}(n),c_2\hat{}(n),\ldots c_{N-1}\hat{}(n)]^T$$

The reference signal r(n) at time step n is expressed by the following equation. In the following equation, "*" indicates a convolution sum.

$$r(n)=\Sigma_{i=0}^{N-1}c_i\hat{}(n)\times x(n-i)=C\hat{}(n)*X(n)=C\hat{}(n)^T\times X(n)$$

Further, the time series vector R(n) is expressed by the following equation.

$$R(n)=[r(n),r(n-1),r(n-2),\ldots,r(n-N+1)]^T$$

The error signal receiving unit 74 receives an error signal e corresponding to the cancellation error noise collected by the microphone 20. The error signal e is a signal corresponding to a cancellation error noise in which the canceling sound and the noise are combined at the position of the microphone 20.

The control filter coefficient updating unit 76 updates the filter coefficient W of the control signal generating unit 70 based on the reference signal r and the error signal e. The control filter coefficient updating unit 76 updates the control filter coefficient W based on the filtered-X LMS algorithm. The control filter coefficient updating unit 76 updates the control filter coefficient W based on the following equation.

$$W(n+1)=$$

$$\begin{pmatrix} W_0(n+1) \\ W_1(n+1) \\ \vdots \\ W_{N-1}(n+1) \end{pmatrix} = \begin{pmatrix} W_0(n) \\ W_1(n) \\ \vdots \\ W_{N-1}(n) \end{pmatrix} - \mu\times e(n)\times \begin{pmatrix} \sum_{i=0}^{N-1} c_i(n)\times x(n-i) \\ \sum_{i=0}^{N-1} c_i(n)\times x(n-1-i) \\ \vdots \\ \sum_{i=0}^{N-1} c_i(n)\times x(n-N+1-i) \end{pmatrix}$$

In the control filter coefficient updating unit 76, the control filter coefficient W is optimized by repeatedly updating the control filter coefficient W. Since the update equation of the control filter coefficient W includes a convolution operation, a computational load due to the update processing of the control filter coefficient W increases.

[Operation and Advantageous Effects]

It is expected that active noise control for reducing noise in the vehicle compartment 14 can be performed using equipment that is readily available to anyone. Therefore, it is conceivable that an active acoustic control program is downloaded from the server 26 on the smartphone 22, and the smartphone 22 is caused to perform active noise control.

In the active acoustic control device 66 using the FIR filter of the comparative example, the convolution operation is included in the update equation for updating the control filter coefficient W by the control filter coefficient updating unit 76. Therefore, if active noise control is performed by the active acoustic control device 66, the load of operation processing becomes large, and the amount of memory used also becomes large. Therefore, the smartphone 22 functioning as the active acoustic control device 66 is required to include the operation processing device 29 capable of performing high-speed operation processing and the large-capacity memory 30. That is, an inexpensive smartphone 22 cannot function as the active acoustic control device 66, and the active noise control process cannot be performed by a device that is readily available to anyone.

Further, in the active acoustic control device 66 using the FIR filter of the comparative example, the secondary path filter coefficient C^ is downloaded from the server 26. Since the identification of the secondary path transfer characteristic C is not performed by the active acoustic control device 66, it is possible to reduce the load of the operation processing of the operation processing device 29 accompanying the identification processing, and the use amount of the memory 30. Since the secondary path transfer characteristic C is different for each vehicle type, the secondary path filter coefficient C^ corresponding to the secondary path transfer characteristic C for each vehicle type is stored in the server 26. Therefore, the active acoustic control device 66 cannot suppress noise in the vehicle compartment 14 of a certain type of vehicle, unless the secondary path filter coefficient C" for the vehicle type is stored in the server 26. That is, a user using a vehicle type for which the secondary path filter coefficient C^ is not stored in the server 26, cannot cause the smartphone 22 to function as the active acoustic control device 66.

Therefore, the present embodiment causes the smartphone 22 on which the active acoustic control program is installed to function as the active acoustic control device 10 using the SAN filter. In the active acoustic control device 10, the update equation for updating the control filter coefficient W by the control filter coefficient updating unit 60 is composed of four arithmetic operations and does not include a convolution operation.

Therefore, in the case that active noise control is performed by the active acoustic control device 10, it is possible to suppress the computational load due to an update processing of the control filter coefficient W. Therefore, the smartphone 22 functioning as the active acoustic control device 10 is not required to include the large-capacity memory 30 and the operation processing device 29 equipped with a processor capable of high-speed operation processing. Therefore, even an inexpensive smartphone 22 can be made to function as the active acoustic control device 10, and the active noise control processing can be performed by a device that is easily available to anyone.

In the present embodiment, the active acoustic control device 10 identifies the secondary path transfer characteristic C and generates the filter coefficients C0^ and C1^ as correction values by the control filter coefficient updating unit 60. The filter coefficients C0^ and C1^ are identified based on the identification sounds at the plurality of predetermined frequencies fm. Accordingly, since the smartphone 22 functioning as the active acoustic control device 10 can identify the secondary path transfer characteristic C, the smartphone 22 can function as the active acoustic control device 10 regardless of the vehicle type of the vehicle 12.

Further, in the present embodiment, the active acoustic control device 10 generates the basic signals xc and xs by the basic signal generating unit 52 based on the number of engine cylinders and the engine rotational speed Ne. Accordingly, the active acoustic control device 10 can reduce the sound having the vibration frequency f which is a fundamental frequency of the noise in the vehicle compartment 14.

In the present embodiment, the microphone 20 is detachably attached in the vehicle compartment 14. Thus, when the user changes to another vehicle 12, the user can remove the microphone 20 from the original vehicle 12 and attach the microphone 20 to the other vehicle 12. Therefore, if the smartphone 22 on which the active acoustic control program is installed is brought into the other vehicle 12, the active noise control can be performed for the other vehicle 12 by the smartphone 22.

Second Embodiment

In the active acoustic control device 10 according to the first embodiment, the identification processing is performed in a state where an identification sound (noise sound) is output from the speaker 16, before the ANC processing is performed. On the other hand, in the active acoustic control device 10 of the second embodiment, the ANC processing and the identification processing are performed in parallel, and the identification processing is performed without using an identification sound. Hereinafter, the active noise control performed by the active acoustic control device 10 according to the present embodiment will be referred to as active noise control of a constant identification type.

[Active Acoustic Control Device]

Figure 18:
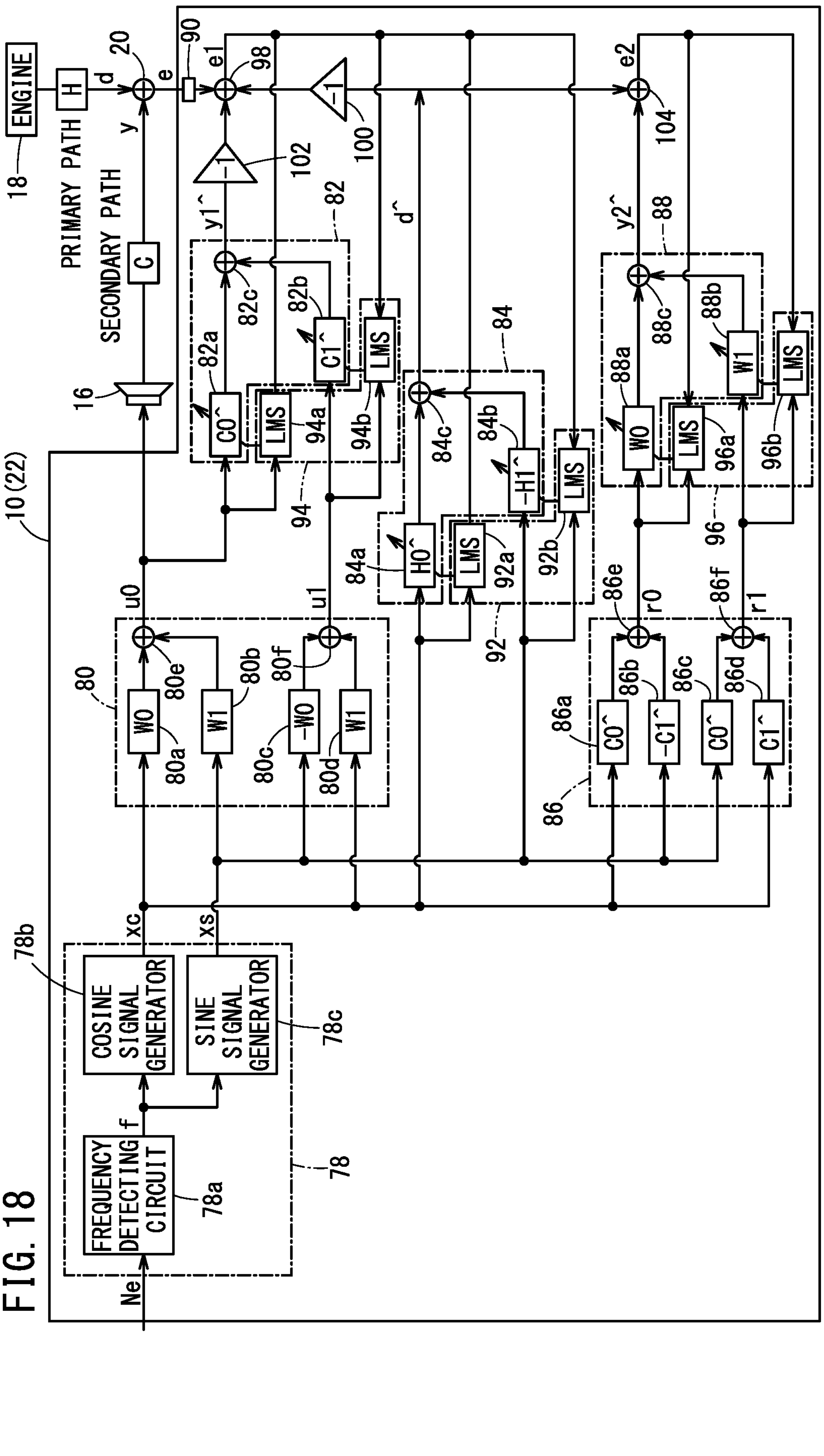
FIG. 18 is a block diagram of an active acoustic control device.

FIG. 18 is a block diagram of the active acoustic control device 10 according to the second embodiment. The active acoustic control device 10 includes a basic signal generating unit 78, a control signal generating unit 80, a first estimated cancellation signal generating unit 82, an estimated noise signal generating unit 84, a reference signal generating unit 86, a second estimated cancellation signal generating unit 88, an error signal receiving unit 90, a primary path filter coefficient updating unit 92, a secondary path filter coefficient updating unit 94, and a control filter coefficient updating unit 96.

The basic signal generating unit 78 generates basic signals xc and xs based on the engine rotational speed Ne. The basic signal generating unit 78 includes a frequency detecting circuit 78*a*, a cosine signal generator 78*b*, and a sine signal generator 78*c*. The processing performed by the basic signal generating unit 78 is the same as the processing performed by the basic signal generating unit 52 of the active acoustic control device 10 of the first embodiment.

The control signal generating unit 80 generates the control signals u0 and u1 based on the basic signals xc and xs. The control signal generating unit 80 includes a first control filter 80*a*, a second control filter 80*b*, a third control filter 80*c*, a fourth control filter 80*d*, an adder 80*e*, and an adder 80*f*.

In the control signal generating unit 80, a SAN filter is used as a control filter. The first control filter 80*a* has a filter coefficient W0. The second control filter 80*b* has a filter coefficient W1. The third control filter 80*c* has a filter coefficient −W0. The fourth control filter 80*d* has a filter coefficient W1. The control filters are optimized by updating the filter coefficients W0 and W1 by the control filter coefficient updating unit 96 described later.

The basic signal xc filtered by the first control filter 80*a* and the basic signal xs filtered by the second control filter 80*b* are added by the adder 80*e* to generate the control signal u0. The speaker 16 is controlled based on the control signal u0, and the canceling sound is output from the speaker 16. The basic signal xs filtered by the third control filter 80*c* and the basic signal xc filtered by the fourth control filter 80*d* are added by the adder 80*f* to generate the control signal u1.

The first estimated cancellation signal generating unit 82 generates an estimated cancellation signal y1^ based on the control signals u0 and u1. The first estimated cancellation signal generating unit 82 includes a first secondary path filter 82*a*, a second secondary path filter 82*b*, and an adder 82*c*.

In the first estimated cancellation signal generating unit 82, a SAN filter is used as a secondary path filter. The secondary path filter coefficient C^ is adaptively updated by the secondary path filter coefficient updating unit 94 described later.

The first secondary path filter 82*a* has a filter coefficient C0^ which is a real part of the secondary path filter coefficient C^(=C0^+iC1^). The second secondary path filter 82*b* has a filter coefficient C1^ which is an imaginary part of the secondary path filter coefficient C^. The control signal u0 filtered by the first secondary path filter 82*a* and the control signal u1 filtered by the second secondary path filter 82*b* are added by the adder 82*c* to generate an estimated cancellation signal y1^. The estimated cancellation signal y1^ is an estimated signal of a signal corresponding to the canceling sound y input to the microphone 20.

The estimated noise signal generating unit 84 generates an estimated noise signal d^ based on the basic signals xc and xs. The estimated noise signal generating unit 84 includes a first primary path filter 84*a*, a second primary path filter 84*b*, and an adder 84*c*. In the estimated noise signal generating unit 84, a SAN filter is used as a primary path filter. The coefficient H^ of the primary path filter (hereinafter referred to as a primary path filter coefficient H^) is adaptively updated by the primary path filter coefficient updating unit 92 described later.

The first primary path filter 84*a* has a filter coefficient H0^ that is a real part of a coefficient H^ (=H0^+iH1^) of the primary path filter. The second primary path filter 84*b* has a filter coefficient −H1^ obtained by inverting the polarity of the imaginary part of the primary path filter coefficient H^. The basic signal xc filtered by the first primary path filter 84*a* and the basic signal xs filtered by the second primary path filter 84*b* are added by the adder 84*c* to generate an estimated noise signal d^. The estimated noise signal d^ is an estimated signal of a signal corresponding to the noise d input to the microphone 20.

The reference signal generating unit 86 generates reference signals r0 and r1 based on the basic signals xc and xs. The reference signal generating unit 86 includes a third secondary path filter 86*a*, a fourth secondary path filter 86*b*, a fifth secondary path filter 86*c*, a sixth secondary path filter 86*d*, an adder 86*e*, and an adder 86*f*.

In the reference signal generating unit 86, a SAN filter is used as a secondary path filter. The secondary path filter coefficient C^ is adaptively updated by the secondary path filter coefficient updating unit 94 described later.

The third secondary path filter 86*a* has a filter coefficient C0^ that is a real part of the secondary path filter coefficient C^ (=C0^+iC1^). The fourth secondary path filter 86*b* has a filter coefficient −C1^ obtained by inverting the polarity of the imaginary part of the secondary path filter coefficient CA. The fifth secondary path filter 86*c* has a filter coefficient C0^ that is the real part of the secondary path filter coefficient C^. The sixth secondary path filter 86*d* has a filter coefficient C1^ that is the imaginary part of the secondary path filter coefficient C^.

The basic signal xc filtered by the third secondary path filter 86*a* and the basic signal xs filtered by the fourth secondary path filter 86*b* are added by the adder 86*e* to generate a reference signal r0. The basic signal xs filtered by the fifth secondary path filter 86*c* and the basic signal xc filtered by the sixth secondary path filter 86*d* are added by the adder 86*f* to generate a reference signal r1. The filter coefficients C0^, C1^, and −C1^ correspond to correction values of the present invention.

The second estimated cancellation signal generating unit 88 generates an estimated cancellation signal y2^ based on the reference signals r0 and r1. The second estimated cancellation signal generating unit 88 includes a fifth control filter 88*a*, a sixth control filter 88*b*, and an adder 88*c*.

In the second estimated cancellation signal generating unit 88, a SAN filter is used as a control filter. The fifth control filter 88*a* has a filter coefficient W0. The sixth control filter 88*b* has a filter coefficient W1. The control filters are optimized by updating the filter coefficients W0 and W1 by the control filter coefficient updating unit 96 described later.

The reference signal r0 filtered by the fifth control filter 88*a* and the reference signal r1 filtered by the sixth control filter 88*b* are added by the adder 88*c* to generate an estimated cancellation signal y2^. The estimated cancellation signal y2^ is an estimated signal of a signal corresponding to the canceling sound y input to the microphone 20.

The error signal receiving unit 90 receives an error signal e corresponding to the cancellation error noise collected by the microphone 20. The error signal e is a signal corresponding to a cancellation error noise in which the canceling sound and the noise are combined at a position of the microphone 20.

The error signal e received by the error signal receiving unit 90 is input to an adder 98. The polarity of the estimated noise signal d^ generated by the estimated noise signal generating unit 84 is inverted by an inverter 100, and the estimated noise signal d^ is input to the adder 98. The polarity of the estimated cancellation signal y1^ generated by the first estimated cancellation signal generating unit 82 is inverted by an inverter 102, and the inverted signal is input to the adder 98. By the adder 98, a virtual error signal e1 is generated.

The estimated noise signal d^generated by the estimated noise signal generating unit 84 is input to an adder 104. The estimated cancellation signal y2^generated by the second estimated cancellation signal generating unit 88 is input to the adder 104. By the adder 104, a virtual error signal e2 is generated.

The primary path filter coefficient updating unit 92 updates the primary path filter coefficient H^(=H0^+iH1^) based on the basic signals xc and xs, and the virtual error signal e1. The primary path filter coefficient updating unit 92 updates the primary path filter coefficient H^ based on a filtered-X LMS (Least Mean Square) algorithm. The primary path filter coefficient updating unit 92 includes a first primary path filter coefficient updating unit 92*a* and a second primary path filter coefficient updating unit 92*b*.

The first primary path filter coefficient updating unit 92*a* and the second primary path filter coefficient updating unit 92*b* update the filter coefficients H0^ and H1^ based on the following equations. In the equations, n denotes the time step (n=0, 1, 2, . . . ), and μ0 and μ1 denote the step size parameters.

$$H0\hat{}(n+1)=H0\hat{}(n)-\mu 0\times e1(n)\times xc(n)$$

$$H1\hat{}(n+1)=H1\hat{}(n)-\mu 1\times e1(n)\times xs(n)$$

A transfer characteristic H of the primary path (hereinafter referred to as a primary path transfer characteristic H) is identified by repeatedly updating the primary path filter coefficient H^ by the primary path filter coefficient updating unit 92. In the active acoustic control device 10 using the SAN filter, the update equations for the primary path filter coefficient H^ are configured by four arithmetic operations and do not include a convolution operation. Therefore, it is possible to suppress a computational load due to update processing of the primary path filter coefficient H^.

The secondary path filter coefficient updating unit 94 updates the secondary path filter coefficient C^ (=C0^+iC1^) based on the control signals u0 and u1, and the virtual error signal e1. The secondary path filter coefficient updating unit 94 updates the secondary path filter coefficient C^ based on the filtered-X LMS algorithm. The secondary path filter coefficient updating unit 94 includes a first secondary path filter coefficient updating unit 94*a* and a second secondary path filter coefficient updating unit 94*b*.

The first secondary path filter coefficient updating unit 94*a* and the second secondary path filter coefficient updating unit 94*b* update the filter coefficients C0^ and C1^ based on the following equations. In the equation, μ2 and μ3 indicate the step size parameters.

$$C0\hat{}(n+1)=C0\hat{}(n)-\mu 2\times e1(n)\times\{W0(n)\times xc(n)+W1(n)\times xs(n)\}$$

$$C1\hat{}(n+1)=C1\hat{}(n)-\mu 3\times e1(n)\times\{-W0(n)\times xs(n)+W1(n)\times xc(n)\}$$

The secondary path transfer characteristic C is identified by repeatedly updating the secondary path filter coefficient C^ by the secondary path filter coefficient updating unit 94. In the active acoustic control device 10 using the SAN filter, the update equations for the secondary path filter coefficient C^ are configured by four arithmetic operations and do not include a convolution operation. Therefore, it is possible to suppress a computational load due to update processing of the secondary path filter coefficient C^.

The control filter coefficient updating unit 96 updates the filter coefficients W0 and W1 based on the reference signals r0 and r1, and the virtual error signal e2. The control filter coefficient updating unit 96 updates the control filter coefficient W based on the filtered-X LMS algorithm. The control filter coefficient updating unit 96 includes a first control filter coefficient updating unit 96*a* and a second control filter coefficient updating unit 96*b*.

The first control filter coefficient updating unit 96*a* and the second control filter coefficient updating unit 96*b* update the filter coefficients W0 and W1 based on the following equations. In the equations, μ4 and μ5 denote the step size parameters.

$$W0(n+1)=W0(n)-\mu 4\times e2(n)\times\{C0(n)\times xc(n)-C1(n)\times xs(n)\}$$

$$W1(n+1)=W1(n)-\mu 5\times e2(n)\times\{C0(n)\times xs(n)+C1(n)\times xc(n)\}$$

The control filter W is optimized by repeatedly updating the filter coefficients W0 and W1 by the control filter coefficient updating unit 96. In the active acoustic control device 10 using the SAN filter, the update equations for the filter coefficients W0 and W1 are configured by four arithmetic operations and do not include a convolution operation. Therefore, it is possible to suppress a computational load due to update processing of filter coefficients W0 and W1.

[Active Noise Control Processing by Smartphone]

In the active acoustic control device 10 of the present embodiment, it is not necessary to perform the identification processing before the ANC processing. Therefore, among the active noise control process performed by the smartphone 22 of the first embodiment, the process from step S5 to step S9 in FIG. 8A is not performed by the smartphone 22 of the present embodiment.

In the ANC ON operation screen 34*b* displayed on the display 34 of the smartphone 22 according to the present embodiment, only the ANC ON button 35*b* is displayed, and the checkbox 35*c* and the like are not displayed. Other processes are the same as those of the active acoustic control device 10 according to the first embodiment.

[Operation and Advantageous Effects]

The present embodiment causes the smartphone 22 on which the active acoustic control program is installed to function as the active acoustic control device 10 using the SAN filter. In the active acoustic control device 10, the update equations for updating the primary path filter coefficient H^ by the primary path filter coefficient updating unit 92, the update equations for updating the secondary path filter coefficient C^ by the secondary path filter coefficient updating unit 94, and the update equations for updating the control filter coefficient W by the control filter coefficient updating unit 96, are configured by four arithmetic operations and do not include a convolution operation.

Therefore, in the case that active noise control is performed by the active acoustic control device 10, it is possible to suppress the computational load due to an update processes of the primary path filter coefficient H^, the secondary path filter coefficient C^, and the control filter coefficient W. Therefore, the smartphone 22 functioning as the active acoustic control device 10 is not required to include the operation processing device 29 capable of performing high-speed operation processing and the large-capacity memory 30. Therefore, even an inexpensive smartphone 22 can be made to function as the active acoustic control device 10, and the active noise control processing can be performed by a device that is easily available to anyone.

Further, in the active acoustic control device 10 of the present embodiment, since the identification processing is performed simultaneously during the ANC processing, even if the primary path transfer characteristic H and/or the secondary path transfer characteristic C may change during the ANC processing, the primary path transfer characteristic H and/or the secondary path transfer characteristic C can be identified.

Third Embodiment

In the first embodiment and the second embodiment, the active acoustic control device 10 generates the control signal u0 for controlling one speaker 16 based on the error signal e input from one microphone 20. In the third embodiment, the active acoustic control device 10 generates control signals u0[*l*] (l=0, 1, . . . , l−1) for controlling l speakers 16 based on error signals e[m] (m=0, 1, . . . , m−1) input from m microphones 20.

Figure 19C:
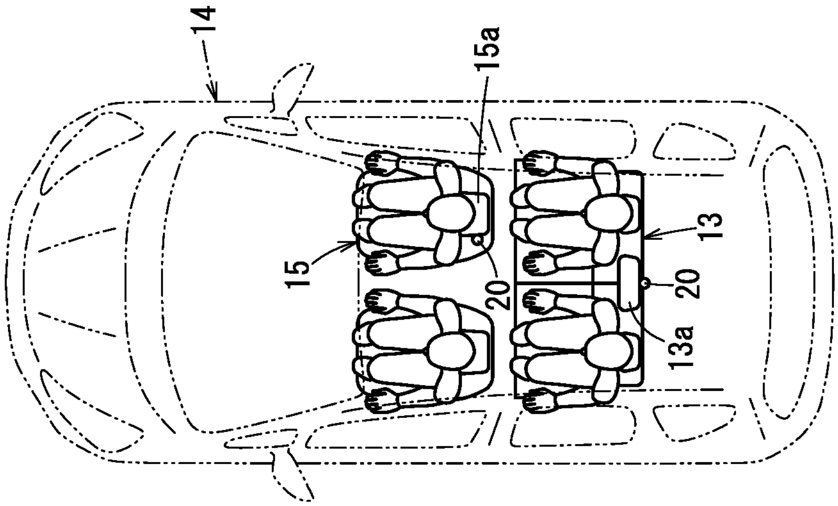
FIG. 19A, FIG. 19B, and FIG. 19C are diagrams illustrating examples of installation positions of microphones in a vehicle compartment.
Figure 19B:
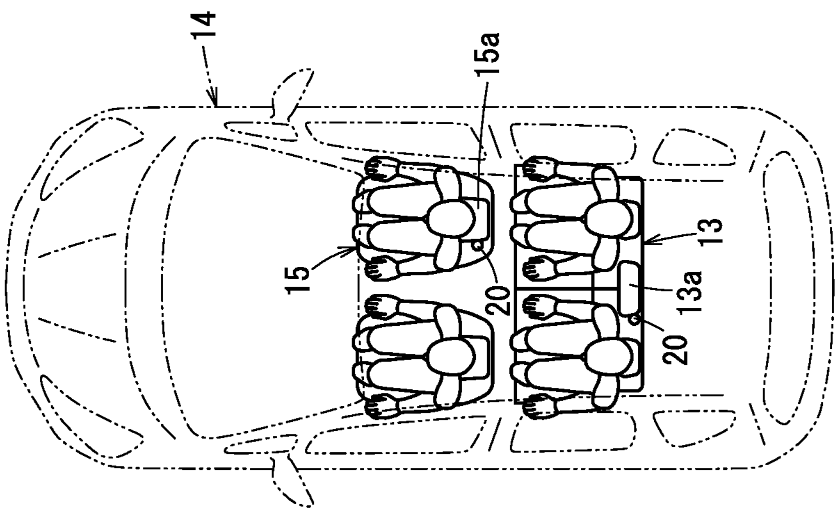
Figure 19A:
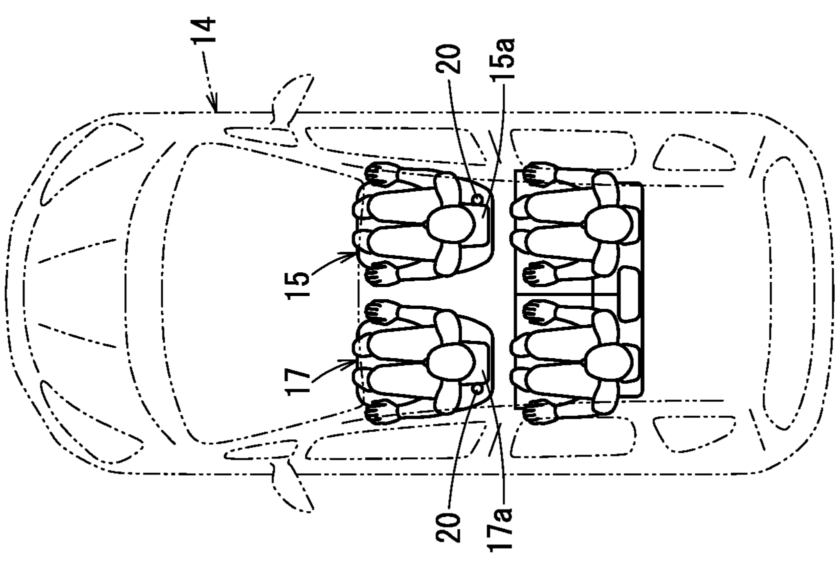

The microphones 20 are installed in the vehicle compartment 14 such that they are easily detachable by the user. FIGS. 19A, 19B, and 19C are views showing examples of installation positions in which two microphones 20 are installed in the vehicle compartment 14. If the vehicle 12 is a right-hand drive vehicle, as shown in FIG. 19A, one microphone 20 is fixed to the right side surface (vehicle outside) of the headrest 15*a* of the driver's seat 15 with double-sided tape or the like, and another microphone 20 is fixed to the left side surface (vehicle outside) of a headrest 17*a* of a passenger's seat 17 with double-sided tape or the like. If the vehicle 12 is a left-hand drive vehicle, one microphone 20 is provided on the left side surface of the headrest 15*a* of the driver's seat 15, and another microphone 20 is provided on the right side surface of the headrest 17*a* of the passenger's seat 17.

The positions where the microphones 20 are set are not limited to the positions shown in FIG. 19A. For example, if the vehicle 12 is a right-hand drive vehicle, one microphone 20 may be fixed to the left side surface (vehicle center side) of the headrest 15*a* of the driver's seat 15 with double-sided tape or the like, and another microphone 20 may be fixed to the left side surface of a headrest 13*a* at the center of the rear seat 13 with double-sided tape or the like, as shown in FIG. 19B. In the case where the vehicle 12 is a left-hand drive vehicle, one microphone 20 may be provided on a right side surface of the headrest 15*a* of the driver's seat 15, and another microphone 20 may be provided on a right side surface of the headrest 13*a* at the center of the rear seat 13.

Further, as shown in FIG. 19C, one microphone 20 may be fixed to the left side surface (vehicle center side) of the headrest 15*a* of the driver's seat 15 with double-sided tape or the like, and another microphone 20 may be fixed to the rear side surface of the headrest 13*a* at the center of the rear seat 13 with double-sided tape or the like. If the vehicle 12 is a left-hand drive vehicle, one microphone 20 may be provided on the right side surface of the headrest 15*a* of the driver's seat 15.

Figure 20:
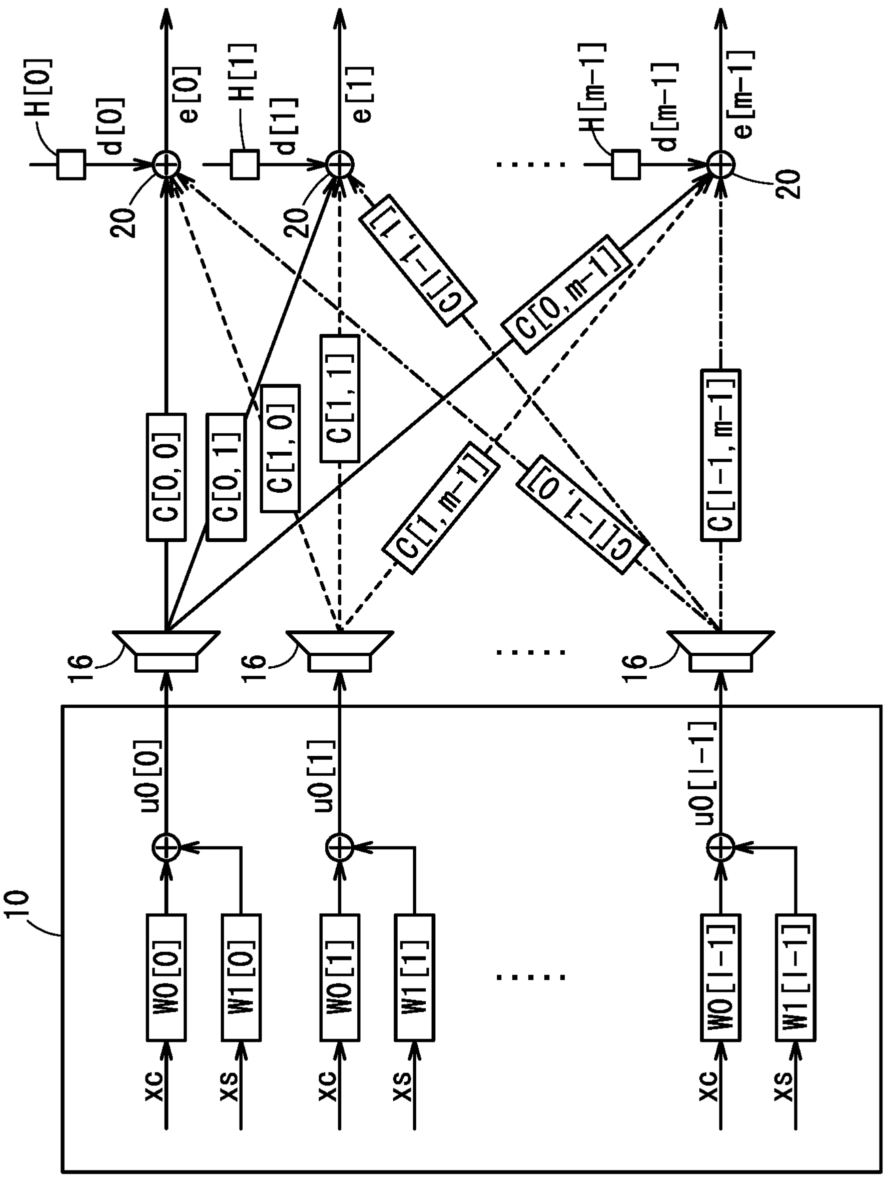
FIG. 20 is an image diagram of active noise control.

FIG. 20 is an image diagram of active noise control using a plurality of microphones 20 and a plurality of speakers 16.

There are m transfer paths (primary paths) from the engine 18 to the microphones 20, each of which has a primary path transfer characteristic H (H[0] to H[m−1]). Therefore, the active acoustic control device 10 requires m primary path filter coefficients H^[0] to H^[m−1] corresponding to the respective primary path transfer characteristics H.

There are (l×m) transfer paths (secondary paths) from each of the speakers 16 to each of the microphones 20, and each of the paths has a secondary path transfer characteristic C (C[0, 0] to C[l−1, m−1]). Therefore, the active acoustic control device 10 requires (l×m) secondary path filter coefficients C^[0, 0] to C^[l−1, m−1] corresponding to the respective secondary path transfer characteristics C.

Since there are 1 speakers 16, the active acoustic control device 10 needs to generate 1 control signals u0 (u0[0] to u0[*l*−1]) to be input to the respective speakers 16. Therefore, the active acoustic control device 10 requires 1 control filter coefficients W (W[0] to W[l−1]).

That is, the numbers of the primary path filter coefficients H^, the secondary path filter coefficients CA, and the control filter coefficients W are determined according to the number of the speakers 16 and the number of the microphones 20.

In the active acoustic control device 10 of the present embodiment, each of the filter coefficients is updated based on the MEFX (Multiple Error Filtered-X)-LMS algorithm. Hereinafter, the update equations of the control filter coefficient W in the active noise control of a prior identification type described in the first embodiment, and the update equations of the primary path filter coefficient H^, the secondary path filter coefficient C^, and the control filter coefficient W in the active noise control of a constant identification type described in the second embodiment, will be described, respectively.

[Filter Coefficient Update Equations in Active Noise Control of Prior Identification Type]

Update equations of the control filter coefficients W0[j] and W1[j] for generating the control signal u0[j] input to the j-th speaker 16 is expressed by the following equations. Here, it is assumed that xc, xs are the basic signals, C[j, k]^ is the secondary path filter coefficient corresponding to the transfer characteristic C[j, k] of the sound in the transfer path from the j-th speaker 16 to the k-th microphone 20, and e[k] is the error signal input to the k-th microphone 20. In the equations, n denotes the time step (n=0, 1, 2, . . . ), and μ0 and μ1 denote the step size parameters.

$$W0[j](n+1)=W0[j](n)-\mu 0\times E_{k=0}^{m-1}e[k](n)\times\Sigma_{k=0}^{m-1}\{C0[j,k](n)\times xc(n)-C1[j,k](n)\times xs(n)\}$$

$$W1[j](n+1)=W1[j](n)-\mu 1\times\Sigma_{k=0}^{m-1}e[k](n)\times E_{k=0}^{m-1}\{C0[j,k](n)\times xs(n)+C1[j,k](n)\times xc(n)\}$$

[Filter Coefficient Update Equation in Active Noise Control of Constant Identification Type]

Update equations of the primary path filter coefficient H[k]^(=H0[*k*]^+iH1[*k*]^) corresponding to the transfer characteristic H[k] of the sound in the transfer path from the engine 18 to the k-th microphone 20 are shown by the following equations. Here, it is assumed that xc and xs are the basic signals, and e1[*k*] is the virtual error signal of the k-th microphone 20. In the equations, n denotes the time step (n=0, 1, 2, . . . ), and μ0 and μ1 denote the step size parameters.

$$H0[k]\hat{}(n+1)=H0[k]\hat{}(n)-\mu 0\times e1[k](n)\times xc(n)$$

$$H1[k]\hat{}(n+1)=H1[k]\hat{}(n)-\mu 1\times e1[k](n)\times xs(n)$$

Update equations of the secondary path filter coefficient C[j, k]^(=C0[*j, k*]^+iC1[*j, k*]^) corresponding to the transfer characteristic C[j, k] of the sound in the transfer path from the j-th speaker 16 to the k-th microphone 20 are expressed by the following equations. Here, it is assumed that xc and xs are the basic signals, e1[*k*] is the virtual error signal of the k-th microphone 20, and W[j] (=W0[*j*]+iW1[*j*]) is the control filter coefficient for generating the control signal u0[*j*] to be input to the j-th speaker 16. In the equations, μ2 and μ3 indicate the step size parameters.

$$C0[j,k]\hat{}(n+1)=C0[j,k]\hat{}(n)-\mu 2\times e1[k](n)\times\{W0[j](n)\times xc(n)+W1[j](n)\times xs(n)\}$$

$$C1[j,k]\hat{}(n+1)=C1[j,k]\hat{}(n)-\mu 3\times[k]\hat{}(n)\times\{-W0[j](n)\times xs(n)+W1[j](n)$$

Update equations of the control filter coefficients W0[*j*] and W1[*j*] used for generating the control signal u0[*j*] input to the j-th speaker 16 are expressed by the following equations. Here, it is assumed that xc, xs are the basic signals, C[j, k]^ is the secondary path filter coefficient corresponding to the transfer characteristic C[j, k] of the sound in the transfer path from the j-th speaker 16 to the k-th microphone 20, and e2[*k*] is the virtual error signal of the k-th microphone 20. In the equations, μ4 and μ5 denote the step size parameters.

$$W0[j](n+1)=W0[j](n)-\mu 4\times E_{k=0}^{m-1}e2[k](n)\times\Sigma_{k=0}^{m-1}\{C0[j,k](n)\times xc(n)-C1[j,k](n)\times xs(n)\}$$

$$W1[j](n+1)=W1[j](n)-\mu 5\times\Sigma_{k=0}^{m-1}e2[k](n)\times E_{k=0}^{m-1}\{C0[j,k](n)\times xs(n)+C1[j,k](n)\times xc(n)\}$$

[Operation and Advantageous Effects]

In the active acoustic control device 10 of the present embodiment, the numbers of the primary path filter coefficients H^, the secondary path filter coefficients C^, and the control filter coefficients W are determined according to the number of the speakers 16 and the number of the microphones 20. Accordingly, the active acoustic control device 10 of the present embodiment can appropriately perform active noise control in accordance with the number of speakers 16 and the number of microphones 20.

Fourth Embodiment

In the first to third embodiments, the smartphone 22 on which an active acoustic control program is installed is caused to function as the active acoustic control device 10. In contrast, in the present embodiment, a vehicle information acquisition device 106 on which an active acoustic control program is installed is caused to function as the active acoustic control device 10.

Figure 21:
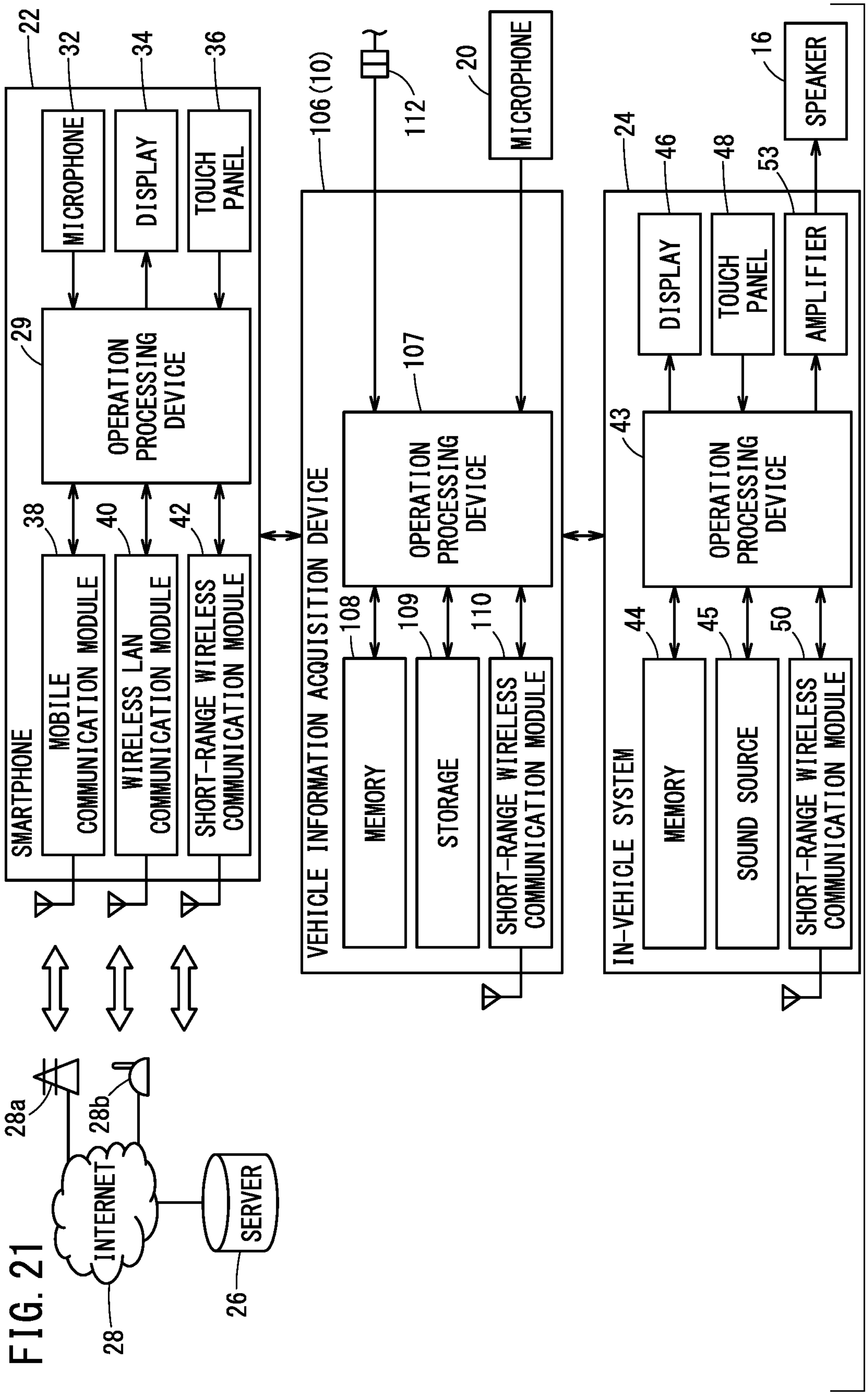
FIG. 21 is a block diagram of a smartphone, an in-vehicle system, and a vehicle information acquisition device.

FIG. 21 is a block diagram of a smartphone 22, an in-vehicle system 24, and the vehicle information acquisition device 106. In the present embodiment, detailed description of the same configurations as those in the first to third embodiments will be omitted.

The vehicle information acquisition device 106 is connected to the smartphone 22 by wire. The vehicle information acquisition device 106 is connected to the in-vehicle system 24 by wire. The vehicle information acquisition device 106 may be wirelessly connected to the smartphone 22 and the in-vehicle system 24.

The active acoustic control program is downloaded from the server 26 to the smartphone 22 via the Internet 28, and the active acoustic control program is transmitted from the smartphone 22 to the vehicle information acquisition device 106. The active acoustic control program transmitted from the smartphone 22 is installed on the vehicle information acquisition device 106.

The information of the ANC processing and the identification processing may be displayed on the display 46 of the in-vehicle system 24 or may be displayed on the display 34 of the smartphone 22.

The vehicle information acquisition device 106 includes an operation processing device 107, a memory 108, a storage 109, and a short-range wireless communication module 110.

The operation processing device 107 is, for example, a processor such as a central processing unit (CPU) or a microprocessing unit (MPU). The memory 108 is, for example, a non-transitory or transitory tangible computer-readable recording medium such as a ROM or a RAM. The storage 109 is, for example, a non-transitory tangible computer-readable recording medium such as a flash memory.

When the active acoustic control program is installed on the vehicle information acquisition device 106, the active acoustic control program is stored in the storage 109. The operation processing device 107 functions as the active acoustic control device 10 when the operation processing device 107 performs active acoustic control processing in accordance with the active acoustic control program stored in the storage 109.

The short-range wireless communication module 110 is a module that performs communication by short-range wireless communication such as Bluetooth (registered trademark). If the vehicle information acquisition device 106 is wirelessly connected to the smartphone 22 and the in-vehicle system 24, the short-range wireless communication module 110 is used to communicate with the smartphone 22 and the in-vehicle system 24.

The vehicle information acquisition device 106 is connected to an on-board diagnostics (OBD) connector 112 provided in the vehicle 12. The OBD connector 112 is connected to an in-vehicle ECU via a CAN or a K line. From the OBD connector 112, vehicle information such as an engine rotational speed, a water temperature, a voltage, and a boost pressure can be acquired.

The vehicle information acquisition device 106 is connected to the microphone 20 by wire. The vehicle information acquisition device 106 and the microphone 20 may be wirelessly connected to each other.

Figure 22A:
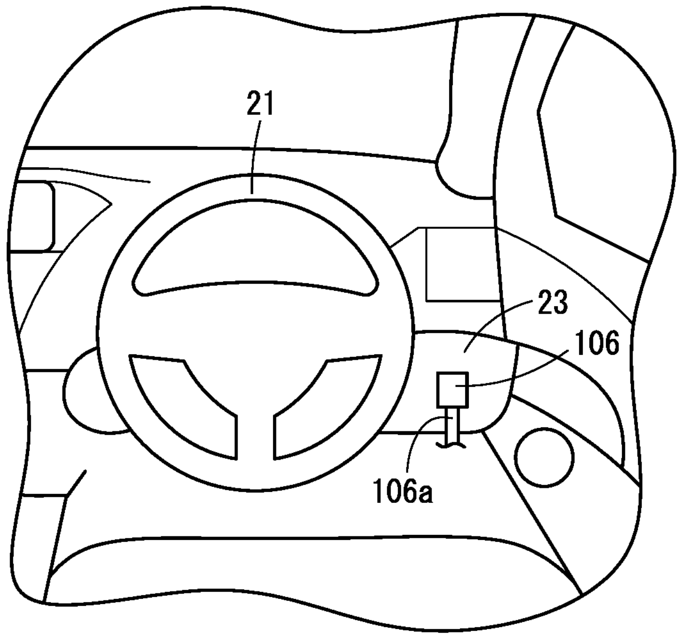
FIGS. 22A and 22B are diagrams showing examples of installation positions of the vehicle information acquisition device in the vehicle compartment.
Figure 22B:
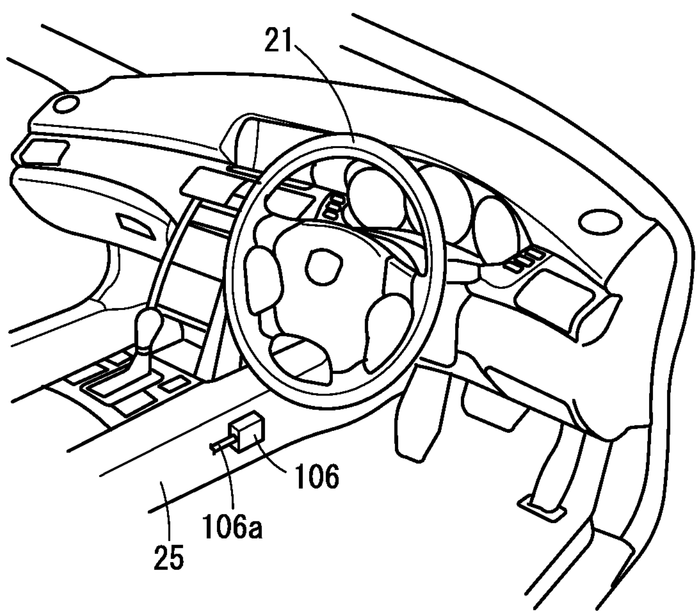

The vehicle information acquisition device 106 can be installed in the vehicle compartment 14 such that it can be easily detachable by the user. FIGS. 22A and 22B are views showing an example of an installation position of the vehicle information acquisition device 106 in the vehicle compartment 14. As shown in FIG. 22A, the vehicle information acquisition device 106 is fixed to a center lower cover 23 at a lower portion of a steering wheel 21 with double-sided tape or the like. A wire **106*a* extends from the vehicle information acquisition device 106, and the vehicle information acquisition device 106 is connected to the smartphone 22 and the in-vehicle system 24 by the wire 106*a***.

The position where the vehicle information acquisition device 106 is set is not limited to the position shown in FIG. 22A. For example, as shown in FIG. 22B, it may be fixed to a side surface of a center console 25 with double-sided tape or the like.

[Operation and Advantageous Effects]

In the present embodiment, the vehicle information acquisition device 106 is connected to the OBD connector 112. Thus, the vehicle information acquisition device 106 can acquire the engine rotational speed Ne from the in-vehicle ECU.

Further, the vehicle information acquisition device 106 is detachably attached in the vehicle compartment 14. Thus, when the user changes to another vehicle 12, the user can remove the vehicle information acquisition device 106 from the original vehicle 12 and attach the vehicle information acquisition device 106 to the other vehicle 12. Therefore, if the vehicle information acquisition device 106 on which the active acoustic control program is installed is attached to the other vehicle 12, the active noise control can be performed in the other vehicle 12 by the vehicle information acquisition device 106.

Fifth Embodiment

In the first to third embodiments, the smartphone 22 on which the active acoustic control program is installed is caused to function as the active acoustic control device 10. In contrast, in the present embodiment, the in-vehicle system 24 on which the active acoustic control program is installed is caused to function as the active acoustic control device 10.

Figure 23:
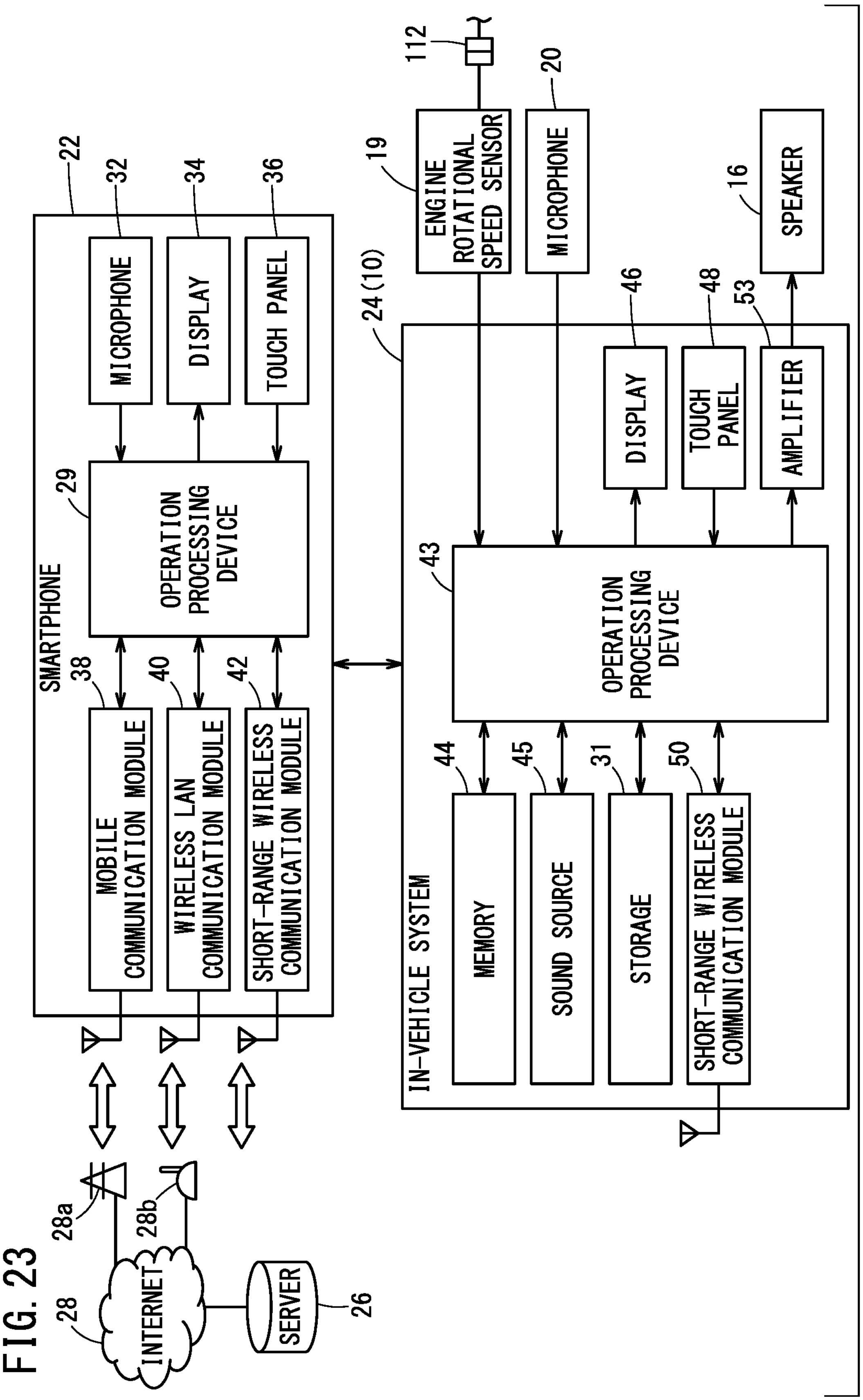
FIG. 23 is a block diagram of a smartphone and an in-vehicle system.

FIG. 23 is a block diagram of a smartphone 22 and an in-vehicle system 24. In the present embodiment, detailed description of the same configurations as those in the first to third embodiments will be omitted.

The in-vehicle system 24 is connected to the smartphone 22 by wire. The in-vehicle system 24 may be wirelessly connected to the smartphone 22.

An active acoustic control program is downloaded from the server 26 to the smartphone 22 via the Internet 28, and the active acoustic control program is transmitted from the smartphone 22 to the in-vehicle system 24. The active acoustic control program transmitted from the smartphone 22 is installed in the in-vehicle system 24.

The information of the ANC processing and the identification processing may be displayed on the display 46 of the in-vehicle system 24 or may be displayed on the display 34 of the smartphone 22.

The in-vehicle system 24 is connected to the engine rotational speed sensor 19 and the microphone 20 by wire. The in-vehicle system 24 may be wirelessly connected to the engine rotational speed sensor 19 and the microphone 20.

[Operation and Advantageous Effects]

In this embodiment, the downloading of the active acoustic control program from the server 26 is performed by the smartphone 22 including a mobile communication module 38 and a wireless LAN communication module 40. Then, the downloaded active acoustic control program is transmitted from the smartphone 22 to the in-vehicle system 24, and the active acoustic control program is installed on the in-vehicle system 24. Accordingly, even in the in-vehicle system 24 in which the mobile communication module or the wireless LAN communication module is not included, the active acoustic control program can be installed, and the in-vehicle system 24 can function as the active acoustic control device 10.

Sixth Embodiment

In the first to fifth embodiments, the active acoustic control device 10 performs active noise control in the active acoustic control. In contrast, in the present embodiment, an active acoustic control device 10 performs active sound effect control in addition to the active noise control. In the active sound effect control, a sound effect simulating the engine sound is output from the speaker 16 in accordance with the engine rotational speed Ne. Thereby, for example, it is possible to give a vehicle occupant of the vehicle 12 feelings of comfort and acceleration.

Figure 24:
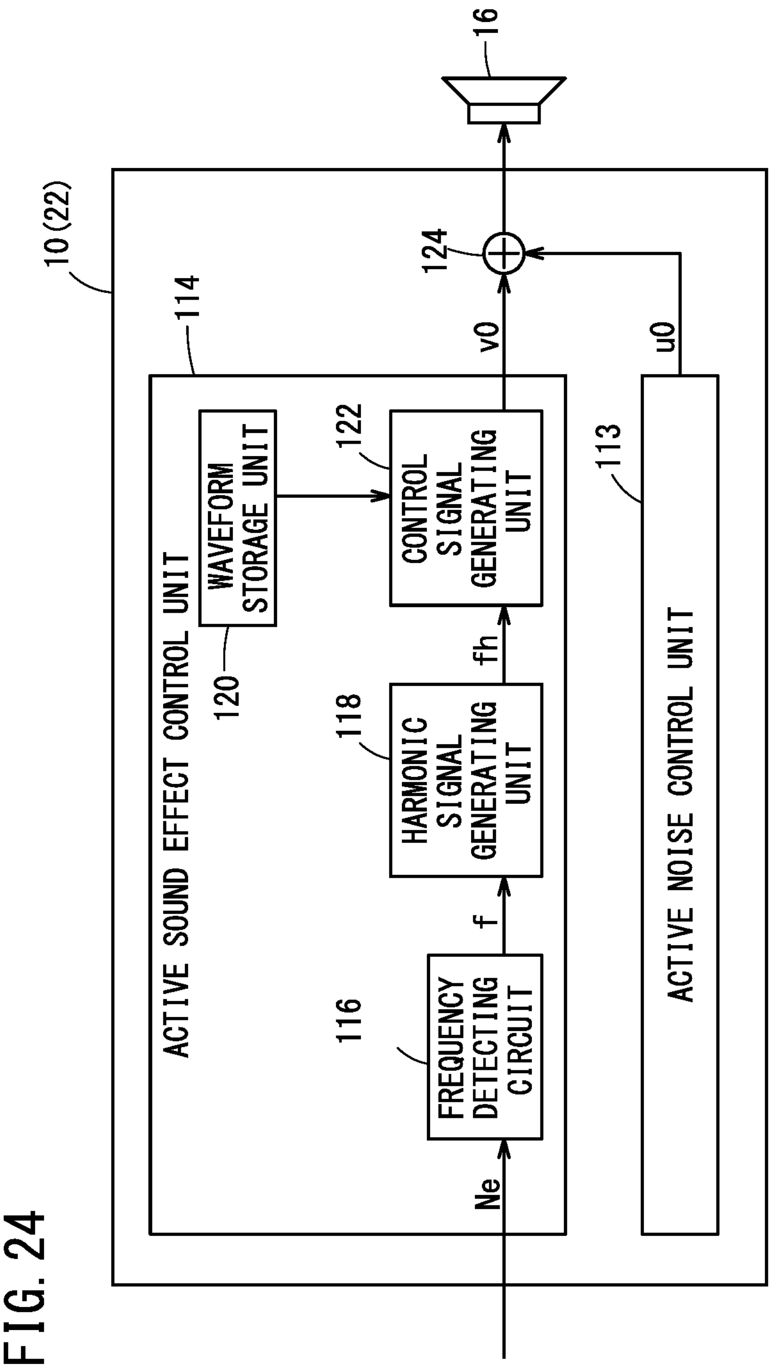
FIG. 24 is a block diagram of an active acoustic control device.

FIG. 24 is a block diagram of the active acoustic control device 10. The active acoustic control device 10 includes an active noise control unit 113 that performs active noise control and an active sound effect control unit 114 that performs active sound effect control. The configuration of the active acoustic control device 10 according to any one of the first to fourth embodiments is used as the configuration of the active noise control unit 113. The active sound effect control unit 114 corresponds to a sound effect generating unit of the present invention.

The active sound effect control unit 114 includes a frequency detecting circuit 116, a harmonic signal generating unit 118, a waveform storage unit 120, and a control signal generating unit 122.

The frequency detecting circuit 116 detects a vibration frequency f in the same manner as the frequency detecting circuit 78*a* of the first embodiment. The harmonic signal generating unit 118 generates a harmonic signal fh that is four times, five times, or six times the vibration frequency f. The waveform storage unit 120 stores waveform data having different amplitudes and phases for respective harmonic signals fh. The control signal generating unit 122 generates a control signal v0 based on the waveform corresponding to the harmonic signal fh.

The control signal u0 output from the active noise control unit 113 and the control signal v0 output from the active sound effect control unit 114 are added by an adder 124. The speaker 16 is controlled based on the control signal u0 and the control signal v0. Thus, a sound effect imitating an engine sound is output from the speaker 16 together with a canceling sound for reducing noise.

[Operation and Advantageous Effects]

The active acoustic control device 10 according to the present embodiment includes the active noise control unit 113 and the active sound effect control unit 114. Thus, a sound effect imitating an engine sound can be output from the speaker 16 together with a canceling sound for reducing noise.

[Modifications]

In the first to sixth embodiments, the vibration frequency f is detected based on the engine rotational speed Ne. There is a high correlation between the acceleration of the vehicle 12 and the engine rotational speed Ne. Therefore, the vibration frequency f may be detected based on the acceleration of the vehicle 12 detected by the acceleration sensor 37 of the smartphone 22 in the vehicle compartment 14.

The engine rotational speed Ne also has a high correlation with the speed of the vehicle 12. Therefore, an accumulated value of acceleration of the vehicle 12 detected by the acceleration sensor 37 of the smartphone 22 in the vehicle compartment 14 may be set as the vehicle speed, and the vibration frequency f may be detected based on the speed.

Terms of Computer in the Present Application

In the present application, a computer refers to a machine that automatically performs complex calculations or operations according to a given procedure. In particular, it refers to an electric machine that can continuously perform input/output, calculation or operation, conversion, and the like of digital data using an electronic circuit or the like, and can be used for various purposes by a person or the like describing and giving detailed processing procedures.

Generally, a device classified as a computer itself includes a personal computer (PC) that is a general purpose computer for personal use, a server or a mainframe that is a large-scale and high-performance computer used in an information system or the like of a company, a supercomputer that is an ultrahigh-performance computer used for scientific and technical calculation or the like, and so on. Also, electrical machines that handle information and data often incorporate a type of computer in some form.

Therefore, in the present application, a computer shall include a communication device of every kind such as a mobile phone, a smartphone, and a tablet terminal, and an electronically controlled home electric appliance and an industrial machine such as a video recorder, a digital television, a digital camera, a game machine, and a vehicle control device.

That is, a computer in the present application includes an input/output device that exchanges data with the outside, a storage device that records data, a control device that executes a program and controls an execution state of the program and a state of each device, a computation device or an operation device that calculates and processes data, and the like.

Among them, the storage device may be divided into a main storage device used for temporary storage and an external storage device (auxiliary storage device) used for permanent storage.

The control device and the computation device may be integrated as one device or a semiconductor chip, and this may be used as a processing device (or a central processing unit, a CPU, or a processor).

The calculation procedure of a computer is recorded and given (concept of a stored-program computer), and this is called a computer program or simply a program.

Terms of Operation Processing Device in the Present Application

An operation processing device is a central processing unit (CPU, microprocessing unit, MPU, processor) in which transistors and semiconductor elements are integrated. The operation processing device is one of the main components of a computer, and is a device that performs control of other devices and circuits, calculation of data, and the like. This is a device that combines a computation device with a control device. In recent years, a microprocessor (MPU: Micro-Processing Unit) integrated on a single IC chip is used.

The operation processing device sequentially reads (fetches) a program of a machine language stored in a main memory (RAM) one by one through a bus, interprets the contents of the program to determine (decode) an operation to be performed, and drives an internal circuit to actually execute processing. The operation processing device includes a control unit that interprets instructions and instructs other circuits to perform operations, and a computation unit (ALU: Arithmetic and Logic Unit) that performs logic operations and arithmetic operations, a register for temporarily storing data, an interface circuit for communicating with the outside, and the like.

Further, in order to fill an excessively large difference in speed and capacity between the register and the main memory, a cache memory having both a speed and a capacity intermediate between those of the two memories is often incorporated.

Terms of Main Storage Device in the Present Application

The main storage device is also referred to as a "main memory", a "memory", or a "RAM". The main storage device is directly connected to a central processing unit (CPU) through electric wiring or the like on a board. The main storage device is a storage device that can be directly read and written by a command of the CPU, and stores a program code that is being executed, data necessary for current processing, and the like. The main storage device is much faster in read/write operation than an external storage device (storage), but is generally several orders of magnitude smaller in capacity than the external storage device because of its high unit price.

A DRAM (Dynamic RAM), which is a kind of RAM (Random Access Memory) of a semiconductor storage device (semiconductor memory), is mostly used as a main storage device (main memory) in a modern computer, and has a characteristic that stored contents are lost when energization to the device is stopped by turning off a power supply of the device. Therefore, as basic operation, a storage is used for permanent storage of data and programs, and when the computer is started, a necessary program or the like is read into a main memory and executed. Many modern CPU products incorporate a storage circuit called a "cache memory" which is faster than the DRAM, but this is used only as a temporary storage location for speeding up communication with the DRAM, and the operation cannot be explicitly controlled with a program.

Terms of Storage in the Present Application

The storage is also referred to as an "external storage device", an "external storage unit", or an "auxiliary storage device". Storage is one of the major components of a computer and is a device that permanently stores data. A magnetic disk (hard disk or the like), an optical disk (CD/DVD/Blu-ray (registered trademark) Disc or the like), a flash memory storage device (USB memory/memory card/SSD (solid state drive) or the like), a magnetic tape or the like corresponds to the storage.

The storage generally refers to a storage device in which stored contents are maintained without being energized, and is used for fixedly storing programs, data, and the like used by a computer over a long period of time. In addition to this, a main storage device (main memory, memory) for storing data by a semiconductor element or the like is incorporated in the computer, and when a user starts a program and processes data, a necessary program is called from the storage to the memory and used.

When devices mounted on the same computer are compared with each other, the storage has a storage capacity which is some orders of magnitude larger than that of the memory (several tens to several thousands times), and cost per capacity is some orders of magnitude smaller, but time required for reading and writing is some orders of magnitude longer.

Technical Idea Obtained from Embodiment

A description will be given below concerning technical concepts that are capable of being grasped from the above-described embodiments.

The active acoustic control program downloaded using the communication device (22) that transmits and receives data to and from the server (26), the active acoustic control program causing the operation processing device (29) to execute a process of generating a control signal that causes the speaker (16) provided in the vehicle compartment (14) of the vehicle (12) to output a canceling sound in order to reduce noise in the vehicle compartment, the active acoustic control program including the basic signal generating unit (52) configured to generate a basic signal corresponding to the noise generated from a noise source, the adaptive notch filter (54) configured to adaptively perform signal processing on the basic signal to generate the control signal, the error signal input unit (56) configured to input an error signal corresponding to a cancellation error noise of the noise and the canceling sound output from the speaker based on the control signal, the identifying unit (60) configured to identify a transfer characteristic of a sound in a space of the vehicle compartment to generate a correction value, the reference signal generating unit (58) configured to generate a reference signal by correcting the basic signal based on the correction value, and the filter coefficient updating unit (60) configured to sequentially update a filter coefficient of the adaptive notch filter based on the error signal and the reference signal in a manner that the error signal is minimized.

In the above-described active acoustic control program, the device on which the active acoustic control program downloaded using the communication device is installed may include the microphone (32), the microphone may detect the cancellation error noise, and the identifying unit may identify a transfer characteristic of a sound having a frequency of the basic signal in a transfer path from the speaker to the microphone to generate the correction value.

In the above-described active acoustic control program, the device on which the active acoustic control program downloaded using the communication device is installed may be connected to the microphone (20), the microphone may detect the cancellation error noise, and the identifying unit may identify a transfer characteristic of a sound having a frequency of the basic signal in a transfer path from the speaker to the microphone to generate the correction value.

In the above-described active acoustic control program, the device on which the active acoustic control program downloaded using the communication device is installed may include the number-of-engine-cylinders input section (35*d*) configured to receive an input of information about a number of engine cylinders, the engine rotational speed acquisition device (19) configured to detect an engine rotational speed may be connected to the device on which the active acoustic control program is installed, and the basic signal generating unit may generate the basic signal based on the number of engine cylinders and the engine rotational speed.

In the above-described active acoustic control program, the device on which the active acoustic control program downloaded using the communication device is installed may include the number-of-speakers input section (35*k*) configured to receive an input of information about a number of speakers, and the number-of-microphones input section (35*m*) configured to receive an input of information about a number of microphones, and a number of correction values and a number of filter coefficients are determined according to the number of speakers and the number of microphones.

In the above-described active acoustic control program, the device on which the active acoustic control program downloaded using the communication device is installed may include the number-of-engine-cylinders input section configured to receive an input of information about a number of engine cylinders, and the acceleration detecting unit (37) configured to detect an acceleration, and the basic signal generating unit may generate the basic signal based on the number of engine cylinders and the acceleration.

The above-described active acoustic control program may further include the sound effect generating unit (114) configured to generate a second control signal that causes the speaker to output a sound effect, based on the engine rotational speed.

In the above-described active acoustic control program, the operation processing device may be caused to function as a sound effect generating unit configured to generate a second control signal that causes the speaker to output a sound effect, based on the acceleration or a speed of the vehicle.

The microphone that detects the cancellation error noise used when causing the operation processing device to execute the process in accordance with the above-described active acoustic control program, wherein the microphone is connected by wire or wirelessly to a device on which the active sound control program downloaded using the communication device is installed, and the microphone is detachably mounted in the vehicle compartment.

The engine rotational speed acquisition device (106) that acquires a engine rotational speed used when causing the operation processing device to execute the process in accordance with the above-described active acoustic control program, wherein the engine rotational speed acquisition device is connected by wire or wirelessly to the device, and is detachably mounted in the vehicle compartment.

REFERENCE SIGNS LIST

12: vehicle
14: vehicle compartment

16: speaker
20, 32: microphone
18: engine (noise source)
19: engine rotational speed sensor (engine rotational speed acquisition device)
22: smartphone (communication device)
26: server
29: operation processing device
35*d*: number-of-engine-cylinders input section
35*k*: number-of-speakers input section
35*m*: number-of-microphones input section
37: acceleration sensor (acceleration detection unit)
52: basic signal generating unit
54: control signal generating unit (adaptive notch filter)
56: error signal input unit
58: reference signal generating unit
60: control filter coefficient updating unit (filter coefficient updating unit, identifying unit)
106: vehicle information acquisition device (engine rotational speed acquisition device)
114: active sound effect control unit (sound effect generating unit)

The invention claimed is:

1. A tangible non-transitory computer-readable storage medium storing an active acoustic control program downloaded using a communication device that transmits and receives data to and from a server, the active acoustic control program causing an operation processing device to execute a control signal generation processing of generating a control signal that causes a speaker provided in a vehicle compartment of a vehicle to output a canceling sound in order to reduce noise in the vehicle compartment, the control signal generating processing comprising:

generating a basic signal corresponding to the noise generated from a drive source;

adaptively performing signal processing on the basic signal with an adaptive notch filter to generate the control signal;

detecting through a microphone provided in the vehicle compartment cancellation error noise obtained by synthesizing the noise and the canceling sound output from the speaker based on the control signal;

inputting an error signal corresponding to a cancellation error noise detected through the microphone;

generating a reference signal by correcting the basic signal based on the correction value; and sequentially updating a filter coefficient of the adaptive notch filter based on the error signal and the reference signal in a manner that the error signal is minimized; and executing, before executing the control signal generation processing, an identification processing of identifying a transfer characteristic of the sound in a transfer path from the speaker to the microphone, wherein the identification processing comprising:

generating, while the drive source is stopped, an identification signal corresponding to an identification sound having a predetermined frequency;

adaptively performing signal processing on the identification signal with the adaptive notch filter to generate the control signal;

detecting through the microphone the identification sound output from the speaker based on the identification signal, and inputting a noise signal corresponding to the identification sound detected through the microphone;

generating a virtual error signal which is a difference between the noise signal and the control signal; and sequentially updating the filter coefficient of the adaptive notch filter based on the virtual error signal and the identification signal in a manner that the error signal is minimized, and using an updated filter coefficient as the correction value.

2. The tangible non-transitory computer-readable storage medium storing the active acoustic control program according to claim 1, wherein the device on which the active acoustic control program downloaded using the communication device is installed comprises a number-of-engine-cylinders input section configured to receive an input of information about a number of engine cylinders, an engine rotational speed acquisition device configured to detect an engine rotational speed is connected to the device on which the active acoustic control program is installed, and the process includes generating the basic signal based on the number of engine cylinders and the engine rotational speed.

3. The tangible non-transitory computer-readable storage medium storing the active acoustic control program according to claim 2, wherein the process includes generating a second control signal that causes the speaker to output a sound effect, based on the engine rotational speed.

4. The tangible non-transitory computer-readable storage medium storing the active acoustic control program according to claim 1, wherein the device on which the active acoustic control program downloaded using the communication device is installed comprises:

a number-of-speakers input section configured to receive an input of information about a number of speakers; and a number-of-microphones input section configured to receive an input of information about a number of microphones, and a number of correction values and a number of filter coefficients are determined according to the number of speakers and the number of microphones.

5. The tangible non-transitory computer-readable storage medium storing the active acoustic control program according to claim 1, wherein the device on which the active acoustic control program downloaded using the communication device is installed comprises:

a number-of-engine-cylinders input section configured to receive an input of information about a number of engine cylinders; and an acceleration detecting unit configured to detect an acceleration, and the process includes generating the basic signal based on the number of engine cylinders and the acceleration.

6. The tangible non-transitory computer-readable storage medium storing the active acoustic control program according to claim 5, wherein the operation processing device is caused to generate a second control signal that causes the speaker to output a sound effect, based on the acceleration or a speed of the vehicle.

7. A microphone that detects a cancellation error noise used when causing an operation processing device to execute a process in accordance with an active acoustic control program stored in a tangible non-transitory computer-readable storage medium according to claim 1, wherein the microphone is connected by wire or wirelessly to a device on which the active sound control program downloaded using the communication device is installed, and the microphone is detachably mounted in the vehicle compartment.

8. An engine rotational speed acquisition device that acquires a engine rotational speed used when causing an operation processing device to execute a process in accordance with an active acoustic control program stored in a tangible non-transitory computer-readable storage medium according to claim 2, wherein the engine rotational speed acquisition device is connected by wire or wirelessly to the device, and the engine rotational speed acquisition device is detachably mounted in the vehicle compartment.

* * * * *